(12) United States Patent
Lee et al.

(10) Patent No.: US 10,932,329 B2
(45) Date of Patent: Feb. 23, 2021

(54) USER INTERFACE FOR INDUCTION HEATING COOKER AND CONTROL METHOD THEREOF

(71) Applicant: SAMSUNG ELECTRONICS CO., LTD., Suwon-si (KR)

(72) Inventors: Joon Ho Lee, Seoul (KR); Joo Hyun Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 444 days.

(21) Appl. No.: 15/483,335

(22) Filed: Apr. 10, 2017

(65) Prior Publication Data

US 2017/0223781 A1  Aug. 3, 2017

Related U.S. Application Data

(62) Division of application No. 13/600,732, filed on Aug. 31, 2012, now Pat. No. 9,618,210.

(30) Foreign Application Priority Data

Sep. 2, 2011 (KR) .................... 10-2011-0088840

(51) Int. Cl.
*H05B 6/12* (2006.01)
*F24C 7/08* (2006.01)
(Continued)

(52) U.S. Cl.
CPC .............. *H05B 6/12* (2013.01); *F24C 7/083* (2013.01)

(58) Field of Classification Search
CPC ........ H05B 6/062; H05B 6/12; H05B 6/1209; H05B 6/1272; H05B 3/74; F24C 7/082; F24C 7/083; H03K 17/96

USPC ..... 219/443.1, 445.1, 446.1, 448.11, 448.12, 219/620, 622, 624, 625, 626, 627, 660, 219/663–668; 345/35, 173, 174
See application file for complete search history.

(56) References Cited

U.S. PATENT DOCUMENTS

| 2005/0078027 A1 | 4/2005 | Philipp |
| 2011/0148773 A1 | 6/2011 | Rudolph |

FOREIGN PATENT DOCUMENTS

| CN | 1438453 A | 8/2003 |
| CN | 200968646 Y | 10/2007 |

(Continued)

OTHER PUBLICATIONS

Korean Notice of Allowance dated May 10, 2017 in corresponding Korean Patent Application No. 10-2011-0088840.

(Continued)

*Primary Examiner* — Hung D Nguyen
(74) *Attorney, Agent, or Firm* — Staas & Halsey, LLP

(57) ABSTRACT

A user interface for an induction heating cooker, a method of controlling the same and an induction heating cooker thereof are provided. The user interface, if a drag touch signal of a drag touch from one position to another position on a display unit is sensed, is configured to change power levels of all of coils in operation to a predetermined reference power level and displays the changed power level. The induction heating cooker is configured to supply the coils with a power corresponding to the reference power level, thereby controlling all of the coils with one drag touch and enabling enhanced security while in a rapid manner.

9 Claims, 36 Drawing Sheets

(51) Int. Cl.
*H05B 6/04* (2006.01)
*H05B 6/06* (2006.01)

(56) References Cited

FOREIGN PATENT DOCUMENTS

| | | | | |
|---|---|---|---|---|
| CN | 101871663 | 10/2010 | | |
| CN | 102056356 | 5/2011 | | |
| DE | 10 2013 207 792 | 11/2013 | | |
| EP | 1 273 851 | 1/2003 | | |
| EP | 1273851 A2 * | 1/2003 | ............. | F24C 7/082 |
| EP | 2 273 678 | 1/2011 | | |
| EP | 2 290 820 | 3/2011 | | |
| EP | 2 551 600 | 1/2013 | | |
| JP | 2000-46348 | 2/2000 | | |
| JP | 2002-219052 | 8/2002 | | |
| JP | 2007-134155 | 5/2007 | | |
| JP | 2007-162968 | 6/2007 | | |
| JP | 2009-54331 | 3/2009 | | |
| JP | 2009-266829 | 11/2009 | | |
| JP | 2010-210175 | 9/2010 | | |
| JP | 2010210175 A * | 9/2010 | | |
| KR | 10-2010-0092509 | 8/2010 | | |
| WO | 2009/119468 | 10/2009 | | |

OTHER PUBLICATIONS

Chinese Office Action dated Apr. 12, 2017 in corresponding Chinese Patent Application No. 201210322340.7.
European Office Action dated Mar. 28, 2017 in corresponding European Patent Application No. 12 181 882.7.
European Office Action dated Apr. 1, 2019 from European Patent Application No. 12181882.7, 6 pages.
Chinese Office Action dated Sep. 19, 2016 in corresponding Chinese Patent Application No. 201210322340.7.
Korean Office Action dated Aug. 31, 2016 in corresponding Korean Patent Application No. 10-2011-0088840.
Korean Office Action dated Oct. 27, 2016 in corresponding Korean Patent Application No. 10-2011-0088840.
Chinese Office Action dated Dec. 28, 2015 in corresponding Chinese Patent Application No. 201210322340.7.
Korean Office Action dated Feb. 25, 2016 in corresponding Korean Patent Application No. 10-2011-0088840.
Korean Office Action dated Aug. 20, 2015 in corresponding Korean Patent Application No. 10-2011-0088840.
European Search Report dated Feb. 4, 2013 in corresponding European Patent Application No. 12 18 1882.7.
Restriction Requirement dated Sep. 9, 2015 in parent U.S. Appl. No. 13/600,732.
Office Action dated Dec. 17, 2015 in parent U.S. Appl. No. 13/600,732.
Final Office Action dated Jul. 15, 2016 in parent U.S. Appl. No. 13/600,732.
Notice of Allowance dated Nov. 25, 2016 in parent U.S. Appl. No. 13/600,732.
Chinese Decision on Grant dated Aug. 4, 2017 in corresponding Chinese Patent Application No. 201210322340.7.
European Office Action dated Jan. 7, 2020 from European Patent Application No. 12181882.7, 11 pages.
Extended European Search Report dated Jul. 30, 2020 from European Application No. 20163613.1, 9 pages.

\* cited by examiner

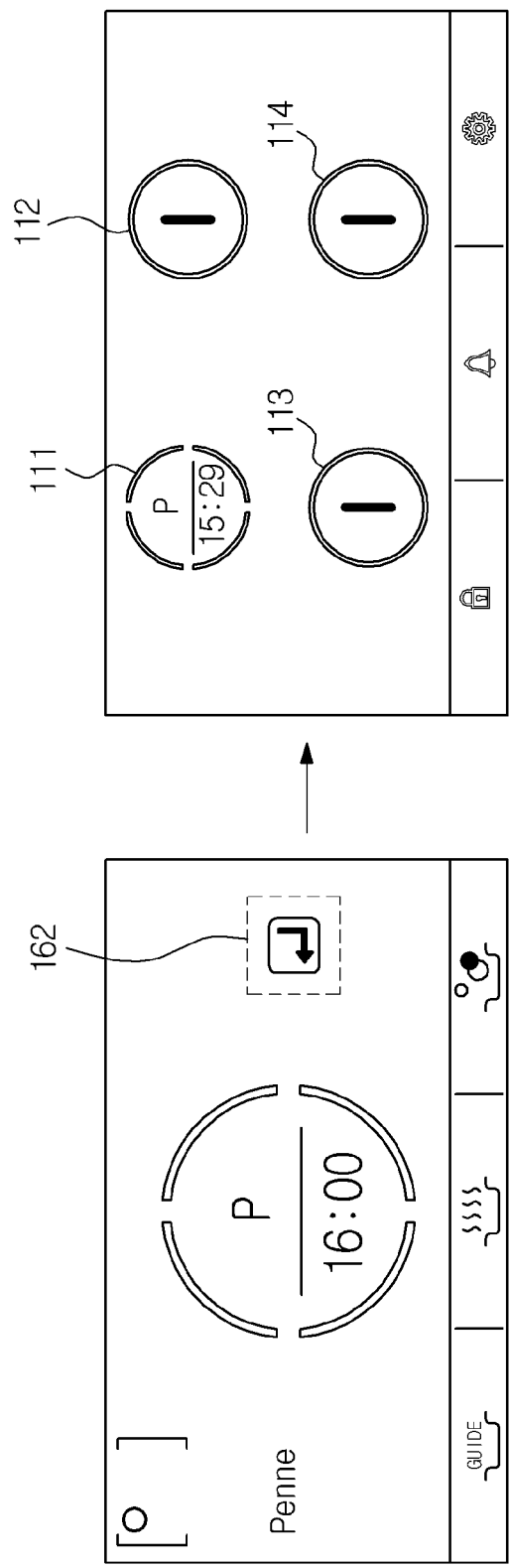

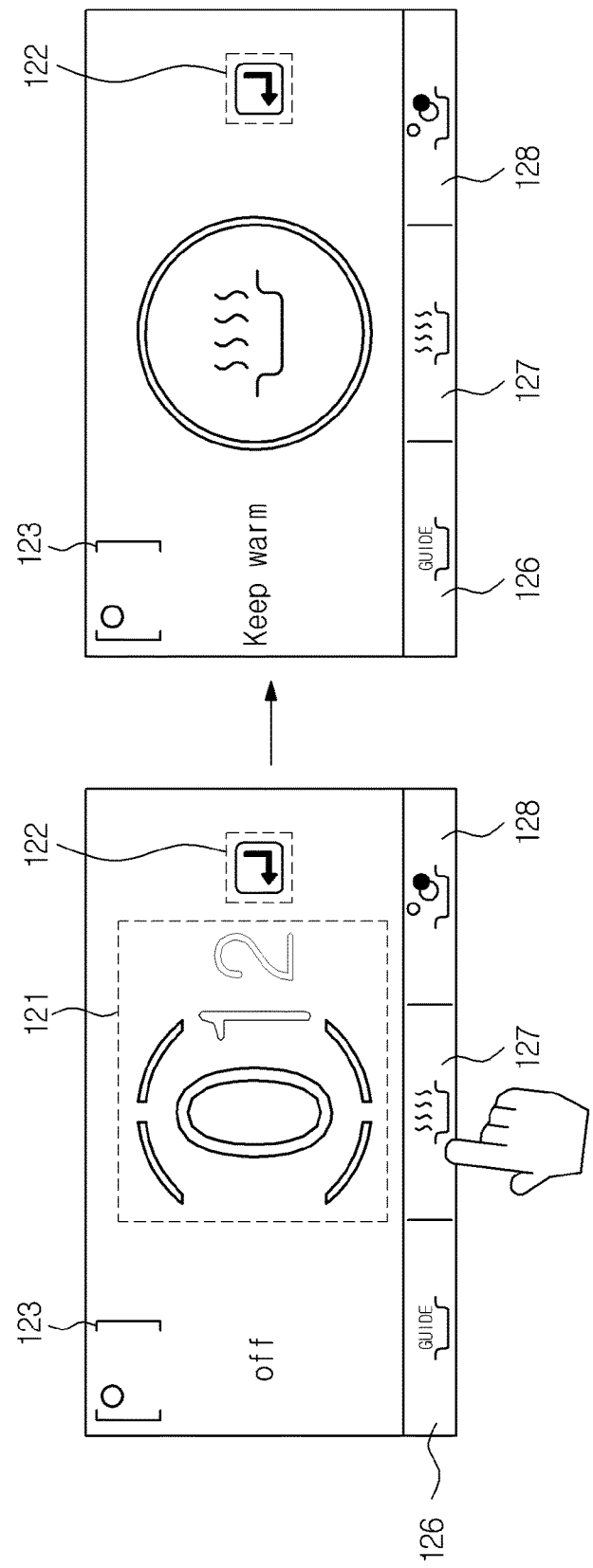

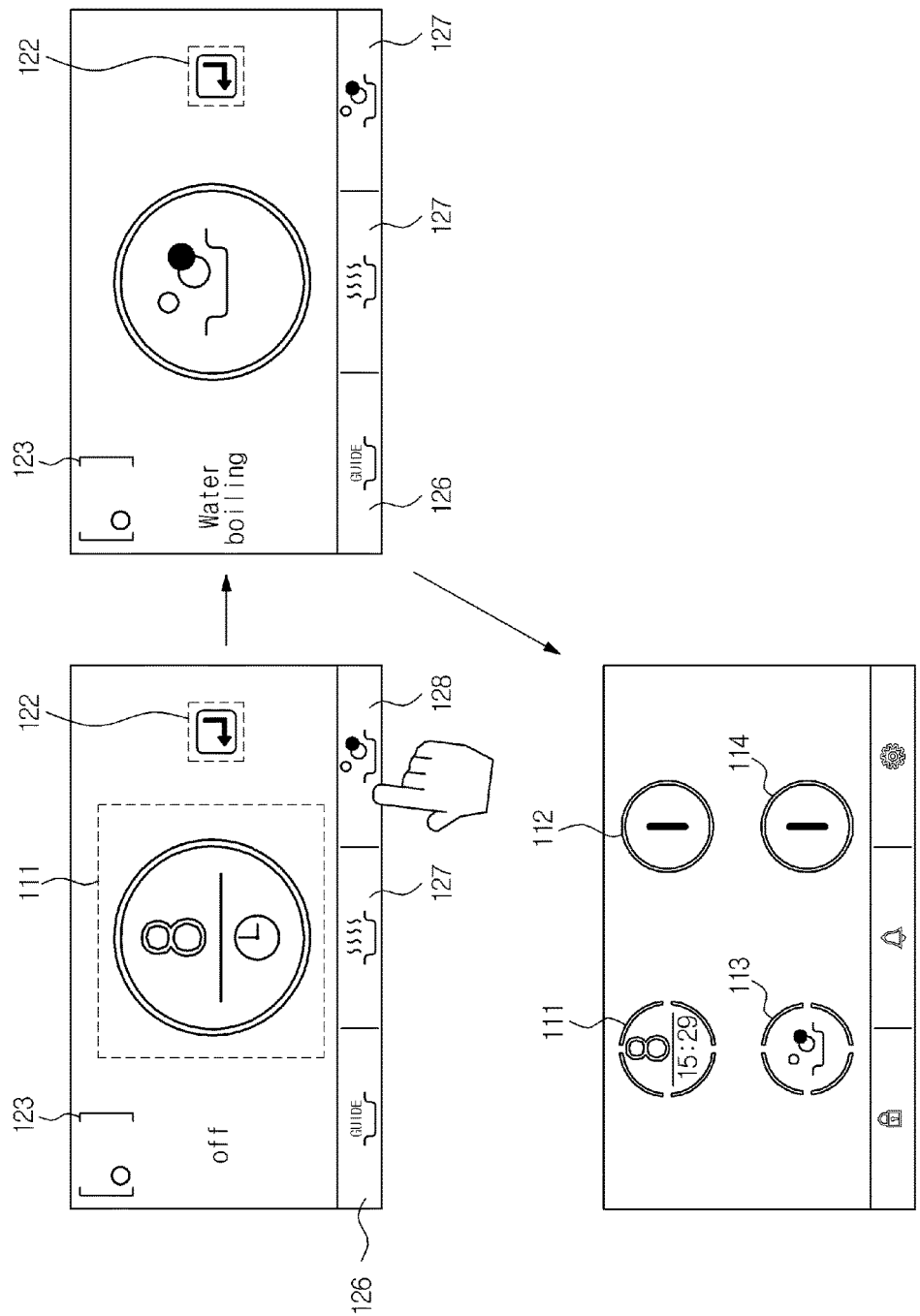

USER INTERFACE FOR INDUCTION HEATING COOKER AND CONTROL METHOD THEREOF

CROSS-REFERENCE TO RELATED APPLICATIONS

This is a Divisional application of U.S. application Ser. No. 13/600,732 filed on Aug. 31, 2012 in the United States Patent and Trademark Office, which claims the priority benefit of Korean Patent Application No. 10-2011-0088840, filed on Sep. 2, 2011 in the Korean Intellectual Property Office, the disclosure of which is incorporated herein by reference.

BACKGROUND

1. Field

Embodiments of the present disclosure relate to a user interface provided on an induction heating cooker and a control method thereof.

2. Description of the Related Art

In recent years, the use of an induction heating cooker is increasing to avoid a toxic gas generation and a gas leak accident that may be caused from using a gas range.

The induction heating cooker is provided with a user interface to adjust the power level or the time for cooking such that a cooking process is effectively controlled according to the configuration of the user interface and that the time for cooking is reduced.

When the user interface is provided in small size, the manufacturing cost is decreased, but a desired control process is achieved only through a plurality of shifts of screens, and thus the efficiency of control is degraded. When the user interface is provided in large size, the efficiency of control is improved, but instead, the manufacturing cost is increased.

SUMMARY

Therefore, it is an aspect of the present disclosure to provide a user interface capable of controlling the power of all coils with only one manipulation without shifting over screens.

It is another aspect of the present disclosure to provide a user interface capable of controlling the power of a desired coil without shifting over screens from a main screen.

Additional aspects of the disclosure will be set forth in part in the description which follows and, in part, will be apparent from the description, or may be learned by practice of the disclosure.

In accordance with one aspect of the present disclosure, a user interface for an induction heating cooker includes a display unit and a sensor unit. The display unit is configured to display a power level of a coil in operation. The sensor unit is configured to sense a touch signal that is input through the display unit. If the sensor unit senses a first drag touch signal corresponding to a drag touch from one position to another position of the display unit, the display unit displays power levels of all coils in operation to a predetermined standard level.

If the sensor unit senses a second drag touch signal through the display unit, the display unit displays power levels of all of the coils in operation to individual power levels provided at a time when the first drag touch signal is sensed.

The second drag touch is performed in an opposite direction to the first drag touch.

In accordance with another aspect of the present disclosure, a user interface for an induction heating cooker includes a display unit and a sensor unit. The display unit is configured to display coil state display units that show operation states of coils in operation. The sensor unit is configured to sense a touch signal that is input through the display unit. If the sensor unit continuously senses the touch signal for at least one of the coil state display units for a predetermined time or above, the display unit displays a power control bar at one side of the at least one coil state display unit, the power control bar configured to adjust a power level of a coil corresponding to the at least one coil state display unit.

If the sensor unit senses a drag touch in one direction with respect to the power control bar, the display unit displays a power level on the coil state display unit while increasing the power level in steps, and if the sensor unit senses a drag touch in opposite direction with respect to the power control bar, the display unit displays a power level on the coil state display unit the power level decreased in steps.

If the sensor unit senses that a drag touch with respect to the power control bar disappears, the display unit keeps displaying a power level that is provided at a time when the drag touch disappears.

In accordance with another aspect of the present disclosure, a user interface for an induction heating coil includes a display unit and a sensor unit. The display unit is configured to display a control screen used to control a predetermined coil that serves as an object of control. The sensor unit is configured to sense a touch signal input through the display unit. The display unit displays a coil map at one region of the control screen, the coil map indicating a position of the predetermined coil relative to remaining coils.

The coil map includes coil state display units for each of the remaining coils.

In accordance with another aspect of the present disclosure, a method of controlling a user interface for an induction heating cooker, wherein the induction heating cooker provides a cooking guide, is as follows: A list of dishes serving as an object of the cooking guide is displayed. If a touch signal is input for one of the dishes, a cooking process corresponding to the touch signal is displayed by use of a power level and a cooking time. If a touch signal for the cooking process is input, a control screen that is used to change a power level or a cooking time of the cooking process is displayed.

The method further includes following processes. If a touch signal for the power level of the control screen is input, a control screen that is used to change the power level is displayed. If a touch signal for the cooking time of the control screen is input, a control screen that is used to change the control screen is displayed. If the change of the power level or the cooking time is completed through the control screen, a cooking process having the m power level or the changed cooking time applied thereto is displayed.

In accordance with another aspect of the present disclosure, a user interface for an induction heating cooker includes a display unit and a sensor unit. The display unit is configured to display a screen that is used to set a power level of a predetermined coil serving as an object of control. The sensor unit is configured to sense a touch signal that is input through the display unit. If the sensor unit senses a touch signal for a power level, the display unit displays a type of cooking corresponding to the power level.

The type of cooking is set according to a respective power level in advance.

In accordance with another aspect of the present disclosure, an induction heating cooker includes a user interface and a control unit. The user interface is configured to display power levels of all of coils in operation at a predetermined standard level, if a drag touch signal corresponding to a drag touch from one position to another position of a display unit is sensed. The control unit is configured to change power levels of all of the coils in operation to the predetermined standard level if the drag touch signal is sensed.

The user interface, if another drag touch signal is sensed after sensing the drag touch signal, displays the power levels of all of the coils in operation to individual power levels that are provided before the power levels of all of the coils in operation are changed. The control unit, if the user interface senses the other drag touch signal after sensing the drag touch signal, changes the power levels of all of the coils in operation to the individual power levels provided before the power levels of all of the coils in operation are changed.

In accordance with another aspect of the present disclosure, an induction heating cooker includes a user interface and a control unit. Upon a continuous sensing of a touch signal for at least one of coil state display units displayed on a display unit for a predetermined time or above, the user interface allows the display unit to display a power control bar at one side of the at least one coil state display unit, the power control bar configured to adjust a power level of a coil corresponding to the at least one coil state display unit. The control unit, if the user interface senses a touch signal for the power control bar, is configured to supply a relevant coil with a power corresponding to a power level that is represented by the touch signal sensed by the user interface.

According to the user interface according to aspects of the present disclosure, a user can control the heating effect of all coils through a single drag touch on a main screen, so that a user can rapidly convert the heating cooker to a safe state from a cooking process in a case when a user is to be occupied with another business.

In addition, the power of a desired coil is controlled without shifting over screens from a main screen, thereby rapidly controlling the cooking process. Without having to enlarge the display unit, a plurality of coils is simultaneously controlled on a single screen, so that the manufacturing cost is reduced.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 14A to 14C illustrate a cooking guide screen displayed by a user interface according to an embodiment of the present disclosure.

FIGS. 18A and 18B illustrate operations corresponding to functions that are provided on a lower end of a control screen according to an embodiment of the present disclosure.

DETAILED DESCRIPTION

Figure 1:
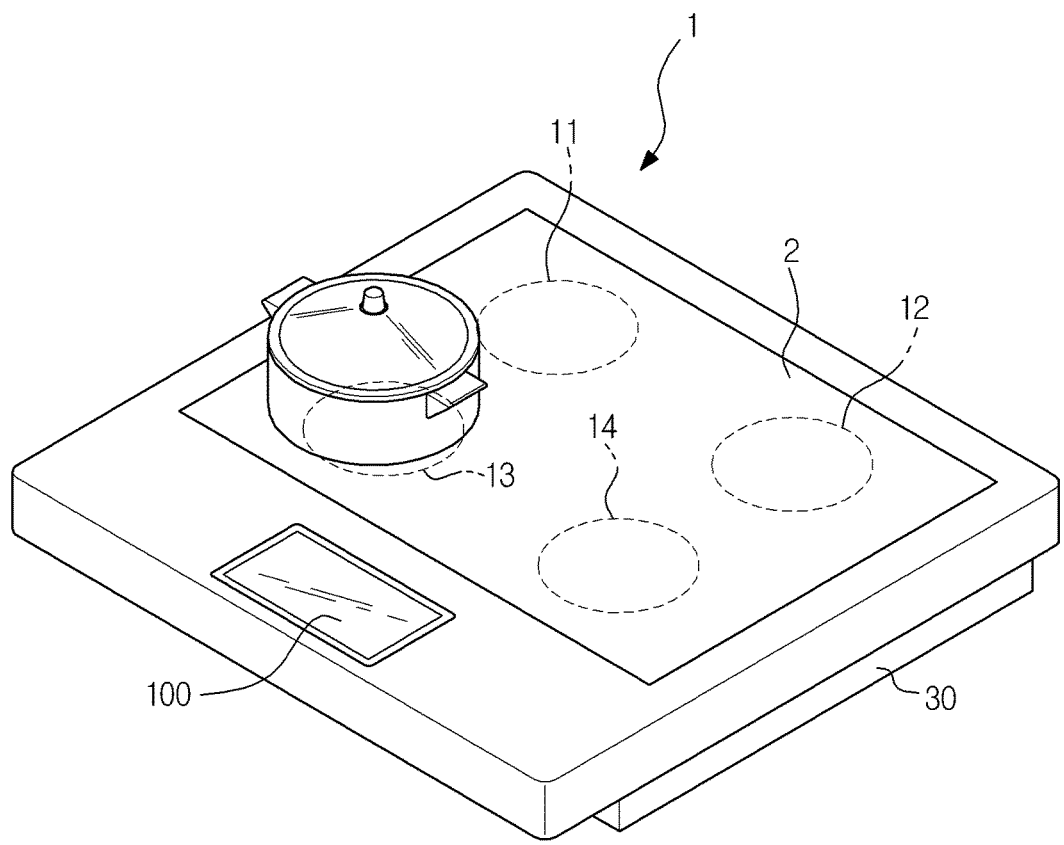
FIG. 1 is a view illustrating the external appearance of an induction heating cooker provided with a user interface according to an embodiment of the present disclosure.

Reference will now be made in detail to embodiments of the present disclosure, examples of which are illustrated in the accompanying drawings, wherein like reference numerals refer to like elements throughout.

Hereinafter, a user interface of an induction heating cooker according to an embodiment of the present disclosure and a control method thereof will be described with reference to accompanied drawings.

FIG. 1 is a view illustrating the external appearance of an induction heating cooker provided with a user interface according to an embodiment of the present disclosure.

Referring to FIG. 1, a cooking plate 2 is installed on an upper side of a body 1 of the induction heating cooker such that a vessel is placed on the cooking plate 2.

A plurality of heating coils are installed at a lower side of the cooking plate 2 inside the body 1 to provide the cooking plate 2 with a heating source. The heating coils are densely disposed on the entire surface of the cooking plate 2. As an example, the description will be made in relation to the induction heating cooker having four heating coils (hereinafter, referred to as a 'coil') including a first coil 11, a second coil 12, a third coil 13, and a fourth coil 14.

In addition, a control unit 30 is provided at a lower side of the cooking plate 2 to driving the coils. The control unit 30 is divided into a coil control unit and a user interface unit, in which the user interface unit is configured to control a power supply for the coils by receiving a manipulation signal that is sensed through a touch by a user. In addition, information displayed or output on a user interface 100 is also controlled by the control unit 30.

The body 1 is provided at an upper side thereof with the user interface 100. The user interface 100 includes a touch panel that is configured to receive a command to drive coils from a user and to display information related to an operation of the induction heating cooker 1. In general, the user interface 100 is provided with an input unit and a display unit, thereby simultaneously serving as the input unit and the display unit. That is, a user learns a current operation state of the induction heating cooker through various types of information displayed on the touch panel. In addition, a user makes contact with the touch panel, thereby allowing the control unit 30 to output a manipulation signal corresponding to the user's contact with the touch panel. Accordingly, the term of the touch panel is used to denote the user interface.

In addition, receiving a manipulation signal input by a user includes sensing a touch signal for a display unit, so the user interface 100 may be divided into a display unit and a sensor unit.

Figure 2A:
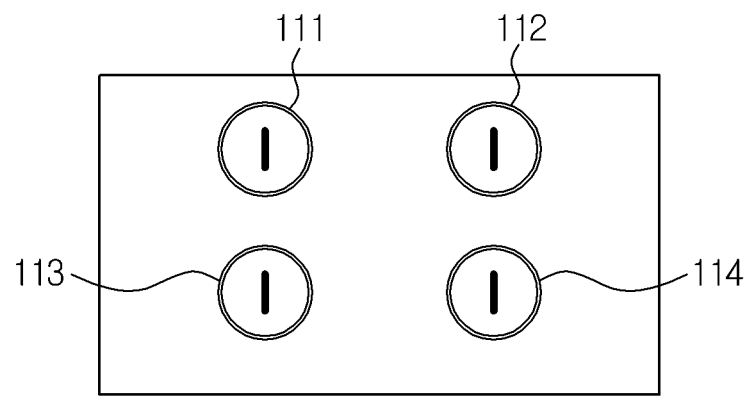
FIGS. 2A and 2B illustrate a main screen and a control screen of the user interface according to an embodiment of the preset disclosure.
Figure 2B:
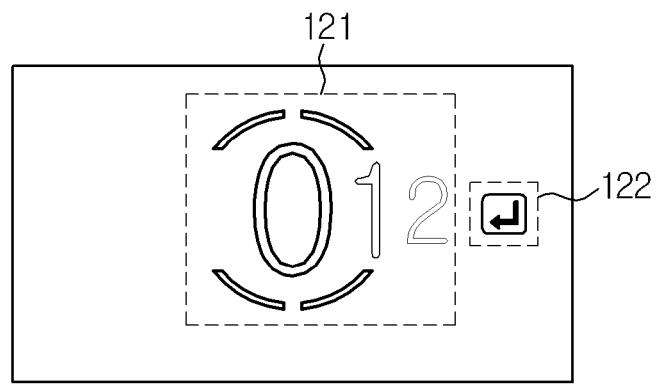

FIGS. 2A and 2B illustrate a main screen and a control screen of the user interface according to an embodiment of the preset disclosure.

As the induction heating coil 1 or the user interface 100 is turned on according to an embodiment of the present disclosure, a main screen is displayed as shown in FIG. 2A. The main screen is provided with coil state display units including a first coil state display unit 111, a second coil state display unit 112, a third coil state display unit 113, and a fourth coil state display unit 114 representing positions and operation states of each coil. In addition, the main screen may be provided at a lower end with buttons for optional functions such as a lock, an alarm, and a setting. The buttons will be described later in detail.

The main screen includes the first coil state display unit 111, the second coil state display unit 112, the third coil state display unit 113, and the fourth coil state display unit 114 each corresponding to a respective coil. When the touch panel is assumed to match a cooking plate, each of the coil state display units 111, 112, 113, and 114 is displayed on the main screen at a region corresponding to the position of a respective coil on the cooking plate. If none of the four coils are being used, power signs are displayed on the coil state display units 111, 112, 113, and 114, thereby notifying that none of the four coils are being used. The method of notifying the state of power is not limited thereto. Alternatively, when none of the four coils are being used, the coil state display units 111, 112, 113, and 114 may be configured such that none are displayed. If a touch signal for one of the coil state display units 111, 112, 113, and 114 is input by a user, a control screen corresponding to the relevant coil is displayed.

FIG. 2B illustrates a control screen of a user interface according to an embodiment of the present disclosure.

If a user touches the second coil state display unit 112 that corresponds to a second coil 12 on the main screen, a control screen for the second coil 12 is displayed. A default screen of the control screen includes a power setting unit 121 that is configured to display and change the power of a coil. The induction heating cooker according to an embodiment is equipped with a maximum power level (P level) in addition to default power levels ranging from 0 to 15, for example.

If a user performs a drag touch on the power setting unit 121 to the left direction, the power level is increased from an initial power level of "0" in steps. The drag touch represents a motion of a finger being moved in one direction while the finger is placed on the touch panel.

The selecting of a desired power level may be implemented through various schemes. For example, the selecting of a desired power level may be achieved by removing the finger from the touch panel or by double-touching the touch panel when a desired power level is displayed while the finger is placed on the drag touch. According to an embodiment, the selecting of a desired power level is achieved by touching a setting button 122 when a desired power level is displayed while the finger is placed on the drag touch.

Figure 3:
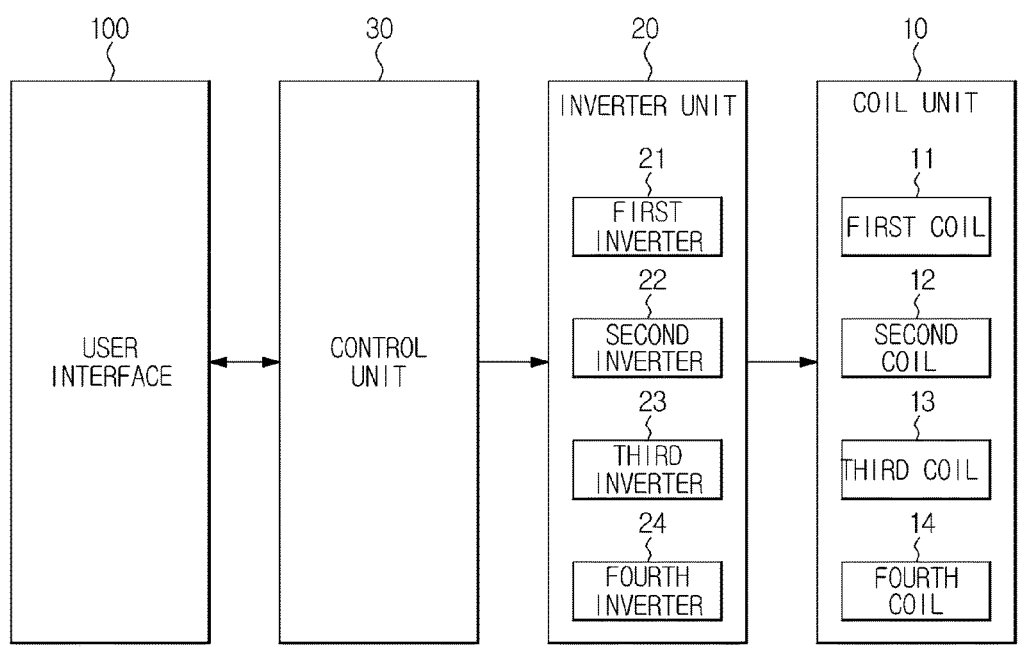
FIG. 3 is a control block diagram illustrating the induction heating cooker according to an embodiment of the present disclosure.

FIG. 3 is a control block diagram illustrating the induction heating cooker according to an embodiment of the present disclosure. Referring to FIG. 3, the induction heating cooker according to an embodiment of the present disclosure includes a coil unit 10, the user interface 100, the control unit 30, and an inverter unit 20. The coil unit 10 includes a plurality of coils that are configured to emit heat to heat a cooking vessel or a vessel for heating placed on the cooking plate. The user interface 100 is configured to display the state of the induction heating cooker to a user and to receive a touch signal for an operation of the induction heating cooker from the user. The control unit 30 is configured to control the user interface 100, and to receive a manipulation signal or a touch signal from the user interface 100 so that inverters are controlled. The inverter unit 20 includes a plurality of inverters 21, 22, 23 and 24 that are configured to supply a plurality of coils with a radio frequency power.

When referring to the above description of power setting shown in FIG. 2, if a user touches a setting button 122 to set a desired power level on the power setting unit 121 for the second coil 12, a manipulation signal corresponding to the touch operation is transmitted to the control unit 30 and the control unit 30 allows the second inverter 22 to convert a direct current power to an alternating current power so that the second coil 12 receives a radio frequency current corresponding to the power level that is set by the user. At the same time, the control unit 30 controls the user interface 100 such that the control screen is changed to a standby screen.

Figure 4A:
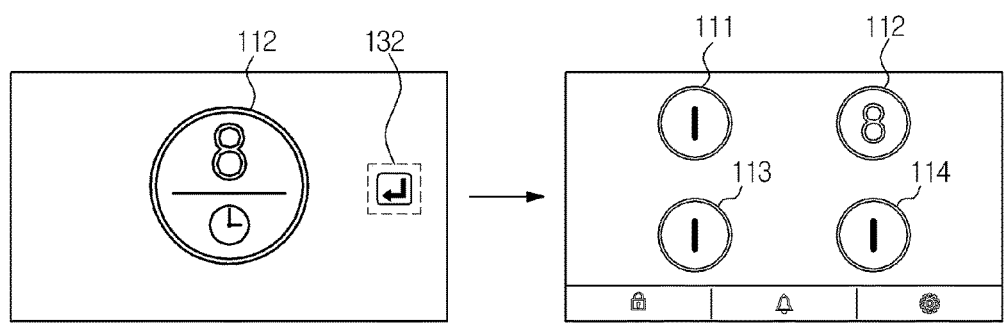
FIGS. 4A and 4B illustrate a standby screen provided after a power level is set and a control screen on which a cooking time is to be set according to an embodiment of the present disclosure.
Figure 4B:
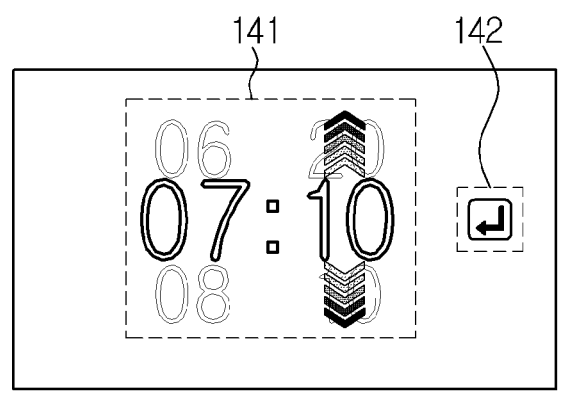

FIGS. 4A and 4B illustrate a standby screen provided after a power level is set and a control screen on which a cooking time is to be set according to an embodiment of the present disclosure. If the power level is set as the user touches the setting button 122, the control screen shown in FIG. 2B designed to set the power level is shifted to a standby screen shown on the left side of FIG. 4A. The standby screen includes the second coil state display unit 112, which shows a state indicating a power level and a cooking time for the corresponding coil. At this time, the setting of the power level is completed, and thus the value of the power level is displayed on one region of the second coil state display unit 112. In addition, anther region of the coil state display unit 112 displays a predetermined icon, for example, a shape of a watch, used in moving onto a control screen on which a cooking time is set.

Since a user may not set the cooking time, if the user does not desire to set the cooking time, the user touches a setting button 132 displayed at one side of the coil state display unit 112 during the standby screen so that the touch panel displays a main screen shown on the right side of FIG. 4A. The main screen completed with all setting will be described later.

If the user touches an icon, for example, a watch icon shown in FIG. 4A, used to set the cooking time, the touch panel displays a cooking time setting screen that is shown in FIG. 4B. The cooking time setting screen displays a cooking time setting unit 141 in which the cooking time is displayed by a unit of minutes and a unit of seconds. If a part corresponding to minutes is drag-touched up and down, the unit of minutes is adjusted. If a part corresponding to seconds is drag-touched up and down, the unit of seconds is adjusted. The setting of the cooking time may be achieved in various schemes. According to an embodiment, a setting button 142 is displayed at one side of the cooking time setting unit 141. If the user touches the setting button 142 when the cooking time setting screen is adjusted to display a desired time through a drag touch by a user, the coil is set to be heated during the desired time.

Figure 5:
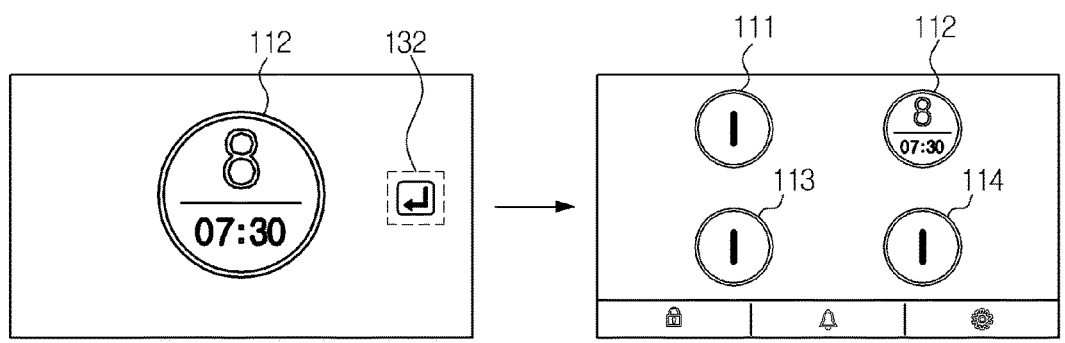
FIG. 5 illustrates a standby screen shown after the settings of the power level and the cooking time are completed according to an embodiment of the present disclosure.

FIG. 5 illustrates a standby screen shown after the setting of the power level and the cooking time are completed according to an embodiment of the present disclosure. If a user finishes setting the cooing time, the touch panel displays a standby screen shown on the left side of FIG. 5. The standby screen includes the coil state display unit 112, which indicates the power level and the cooking time that are currently set for the corresponding coil. The setting button 132 is provided at one side of the coil state display unit 112. If a user touches the setting button 132, the setting of the power level and the cooking time indicated on the coil state display unit 112 is confirmed, and a signal related to the setting is transmitted to the control unit 30, so that the corresponding coil is heated during the set cooking time at the set power level. Alternatively, even if the setting button 132 is not touched, if a touch signal is not input during a predetermined period of time while the standby screen is being displayed, it is determined to start a cooking based on the cooking time and the power level that are indicated on the coil state display unit. If the setting button 132 is touched, a main screen is displayed as shown on the right side of FIG. 5, in which the main screen indicates the power level and the cooking time that are completed with setting.

Figure 6A:
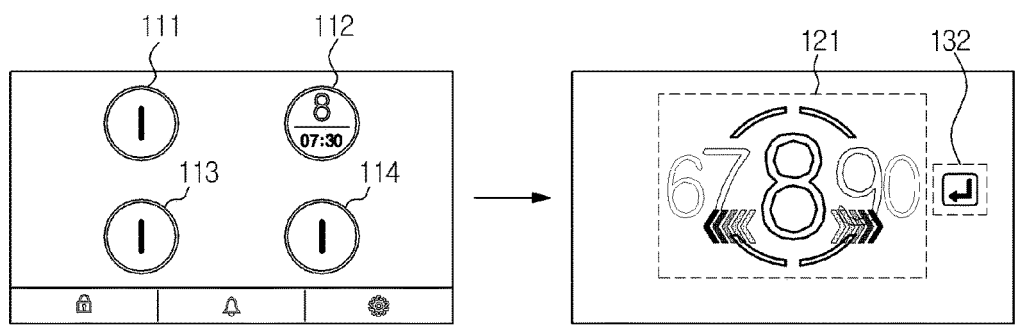
FIGS. 6A and 6B illustrate a screen, after one coil starts a cooking process, configured to set the power level and the cooking time of another coil according to an embodiment of the present disclosure.
Figure 6B:
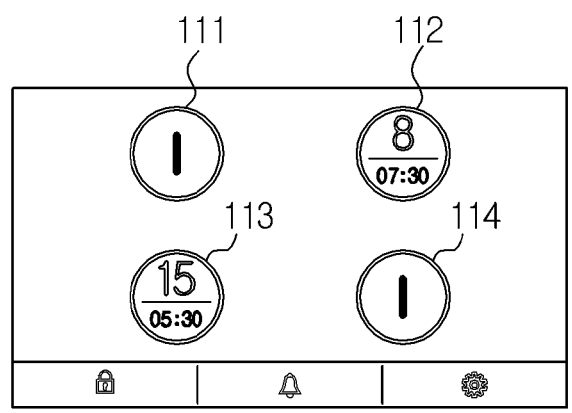

FIGS. 6A and 6B illustrate a screen, after one coil starts a cooking process, configured to set the power level and the cooking time of another coil according to an embodiment of the present disclosure.

For example, after the power level and the cooking time for the second coil 12 are completed, when the second coil 12 starts heating, the user interface 100 displays a main screen shown on the left side of FIG. 6A. The main screen includes the first coil state display unit 111, the second coil state display unit 112, the third coil state display unit 113, and the fourth coil state display unit 114. The second coil state display unit 112 indicates the power level (8) and the cooking time (7 minutes and 30 seconds) for the second coil 12 as set above.

The remaining coil state display units 111, 113, and 114 indicate the same sign as those in the initial state, that is, the power sign. At this time, if the user touches the third coil state display unit 113 to use the third coil 13, a screen shift is made to a control screen for the third coil 13. Similar to the method of setting the power level and the cooking time for the second coil 12 as shown before, the user sets the power level and the cooking time. After the setting of the power level and the cooking time for the third coil 13 are completed, if a cooking starts for the third coil 13, the user interface 100 displays the main screen again.

FIG. 6B illustrates the main screen of the induction heating cook in which the second coil 12 and the third coil 13 are in operation. The second coil state display unit 112 indicates the power level (8) and the cooking time (7 minutes and 30 seconds) as shown in FIG. 6B, and the third coil state display unit 113 indicates the power level (15) and the cooking time (5 minutes and 30 seconds) that are set for the third coil 13. Since the first coil 11 and the fourth coil 14 have not been subject to a certain setting, the first coil state display unit 111 and the fourth coil state display unit 114 indicate the same sign as those in the initial state, that is, the power sign. The touch panel shown in FIG. 6B informs the user that the second coil 12 is being heated for 7 minutes and 30 seconds at the power level (8) and the third coil 13 is being heated for 5 minutes and 30 seconds at the power level (15). In addition, the coil state display unit may reduce the cooking time as time elapses after the start of cooking, thereby displaying the remaining time left before cooking is completed.

Hereinafter, a user interface capable of effectively controlling the power level or the cooking time of each coil during a cooking will be described.

Figure 7:
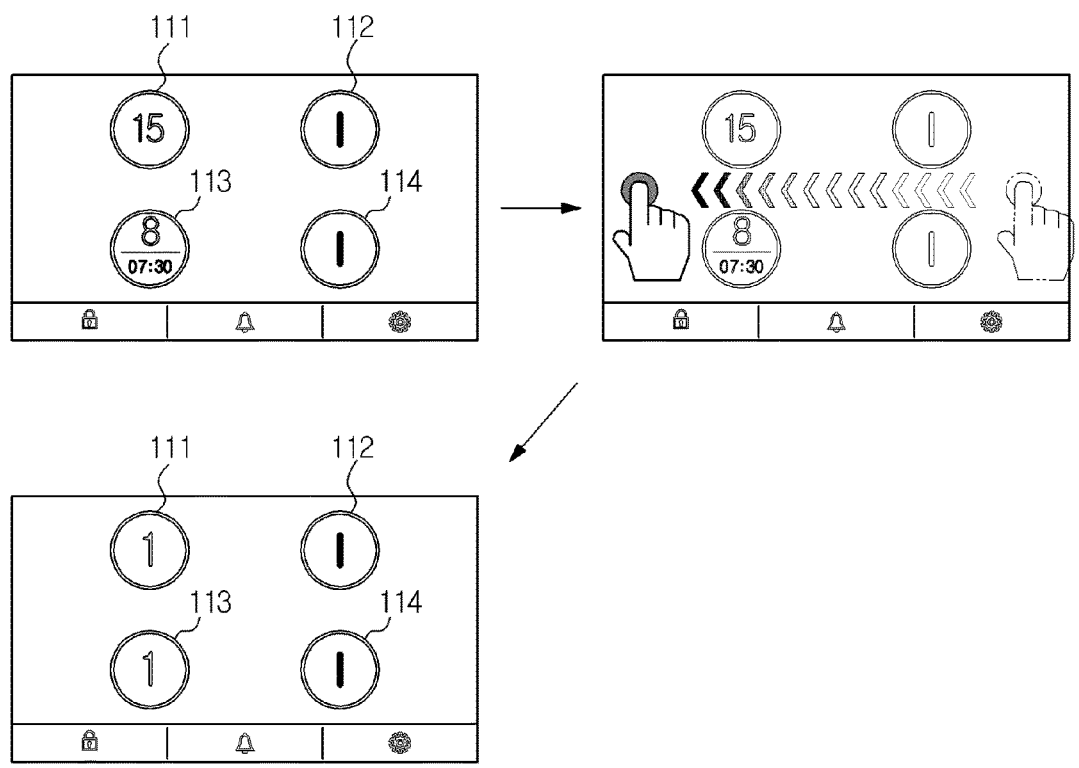
FIG. 7 illustrates a main screen of the user interface on which the power levels of all coils are controlled according to an embodiment of the present disclosure.

FIG. 7 illustrates a main screen of the user interface on which the power levels of all coils are controlled according to an embodiment of the present disclosure.

A user may be in a situation to temporarily stop cooking for a short period of time, as a user encounters with another task to conduct while using an induction heating cooker. For example, in a state that a user is cooking while having cooking vessels placed on the first coil 11 and the third coil 13, the user may be expected to receive a phone call and leave in a hurry.

At this time, the user interface 100 according to an embodiment of the preset disclosure allows the user to drag-touch a main screen shown in FIG. 7 so that the power levels of the first coil 11 and the third coil 13 are simultaneously adjusted. For example, if a user performs a drag touch from the right end to the left end of the touch panel in a main screen showing the state of all of the coils, the control unit 30, which receives a touch signal corresponding to the drag touch controls the inverter unit 20 such that the power levels of the first coil 11 and the third coil 13 in operation are changed to a predetermined standard power level.

The predetermined standard power level may represent a power level that does not cause an accident even if the state of the induction heating cooker is not checked during a predetermined period of time, or the power level capable of keeping enough of the heat of the coil to resume the cooking without the need for a maximum power level. According to an embodiment of the present disclosure, the standard power level is set as level 1.

As shown in FIG. 7, if the user performs a drag touch from the right end to the left end of the touch panel or the display unit, the power levels of the first coil state display 111 and the third coil state display unit 113 are changed to level 1. The control unit 30 supplies the first coil 11 and the third coil 13 with a power corresponding to level of 1.

In a case that the cooking time of the coil is set, if the power level is changed to the standard level, a cooking is not regarded to normally proceed. Accordingly, the cooking time is held to the time when the drag touch is performed, to prevent the remaining time left from decreasing.

Figure 8:
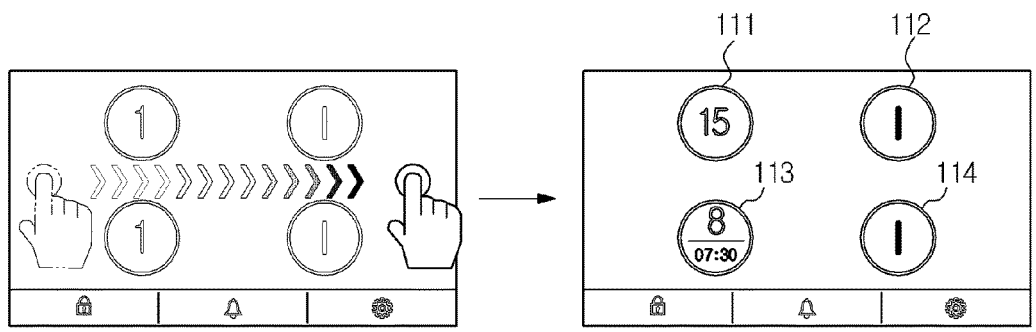
FIG. 8 illustrates a screen on which the power level is recovered from a reference power level to an original power level according to an embodiment of the present disclosure.

FIG. 8 illustrates a screen on which the power level is recovered from a predetermined reference power level to an original power level according to an embodiment of the present disclosure.

Referring to FIG. 8, in order to recover the power level, a user receives a signal corresponding to an overall drag touch on the main screen. For example, if a drag touch is performed from the left end to the right end opposite to FIG. 7, the first coil display unit 111 indicates the original power level (15), and the third coil display unit 113 indicates the original power level (8) and the cooking time. The control unit 30 controls the first inverter 21 and the third inverter 23 such that a power corresponding to the power level (15) is supplied to the first coil 11, and a power corresponding to the power level (8) is supplied to the third coil 13. It should be noted that the drag touch does not change the non-operational state of a coil and the coil state display unit corresponding to the coil. A coil in operation is determined depending on whether the power level is set to exceed 0.

The drag touch operations described with reference to FIGS. 7 and 8 are provided as an example. For example, when it is assumed that a drag touch to change the power to the standard level is referred to a first drag touch, and a drag touch to recover the original power level is referred to a second drag touch, the first drag touch may be made from the left side to the right side, and the second drag touch may be made from the right side to the left side. For example, the first drag touch may be made in the same direction as that of the second drag touch. For example, the first drag touch and the second drag touch may be made in a traverse direction and in a longitudinal direction of the touch panel, respectively. The control unit 30 identifies the first drag touch from the second drag touch based on the sequence of drag touch signals being input.

Although the recognition is achieved through a drag touch from one end to the other end of the touch panel according to the previous embodiment, the present disclosure is not limited thereto, and the recognition may be achieved through a minimum length of drag touch enabling the control to recognize a drag touch. For example, the recognition of the first drag touch or the second drag touch may be achieved through a drag touch from one position to another position that has half the total length of the touch panel.

Although the drag touch is sensed when the touch panel displays the main screen according to the previous embodiment, the present disclosure is not limited thereto. For example, even if a different screen is displayed other than the main screen, if a drag touch on the entire screen surface of the touch panel is sensed, the power levels of all of the coils may be adjusted.

Although the power levels of all of the coils in operation are controlled through the drag touch, the present disclosure is not limited thereto. For example, the cooking time of all of the coils may be controlled through the drag touch, which is described later with reference to FIGS. 9A and 9B.

Figure 9A:
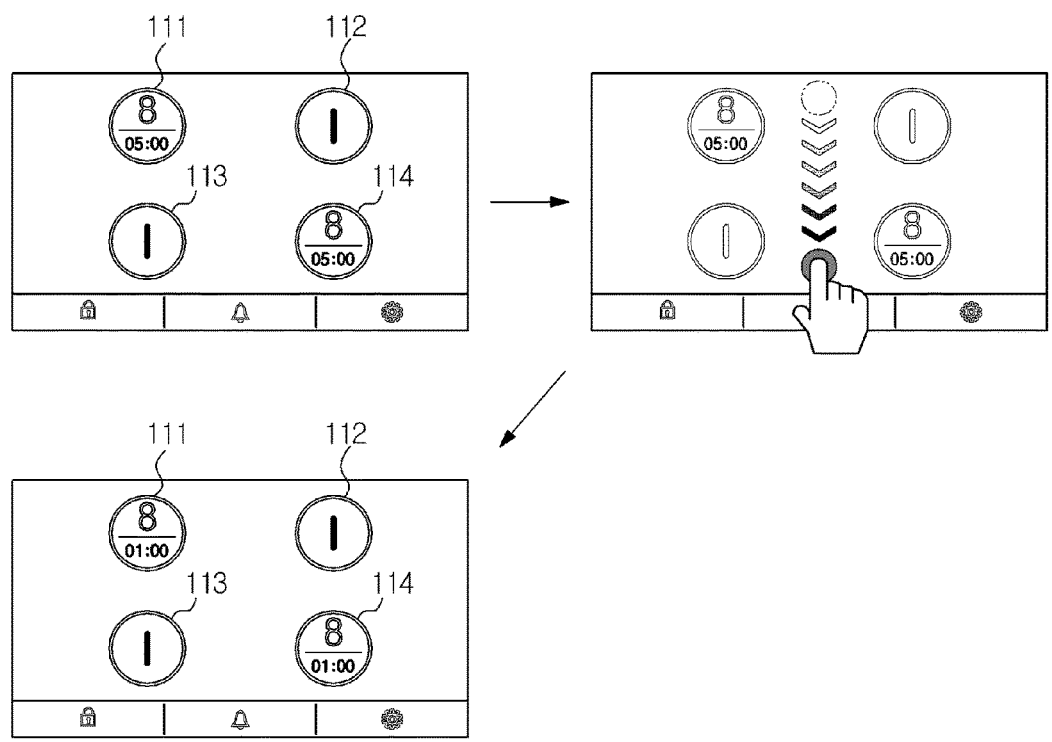
FIGS. 9A and 9B illustrate a screen to control the cooking time of all coils in operation according to an embodiment of the present disclosure.
Figure 9B:
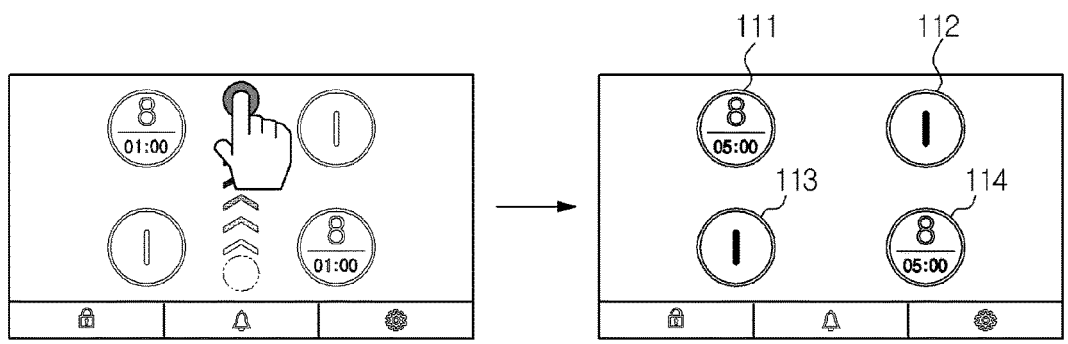

FIGS. 9A and 9B illustrate a screen to control the cooking time of all coils in operation according to an embodiment of the present disclosure.

Referring to FIG. 9A, when each of the first coil 11 and the fourth coil 14 is heated at the power level of 8 and has the remaining time of five minutes, if a drag touch, hereinafter referred to as a third drag touch, is performed by a user from the upper side to the lower side of the touch panel on a main screen, the remaining time of the first coil 11 and the fourth coil 14 may be changed to a predetermined standard cooking time. For example, in a case that the standard cooking time is set to one minute, if the third drag touch is input, the control unit 30 changes the remaining cooking time of each of the first coil state display unit and the fourth coil state display unit to one minute, and controls the first inverter and the fourth inverter 24 such that a power supply to the first and fourth coils 14 are stopped after a lapse of one minute.

Referring to FIG. 9B, if a fourth drag touch from the lower side to the upper side of the touch panel is sensed, the control unit recovers the remaining cooking time of the first and the fourth coil state display units 111 and 114 to the cooking time that is provided before the third drag touch is input.

According to an embodiment described with reference to FIGS. 7 to 9, all of the coils are controlled at once, thereby ensuring a rapid and efficient operation. The following embodiment will be made in relation to a user interface that is configured to individually control all of the coils without shifting over screen from a main screen.

Figure 10:
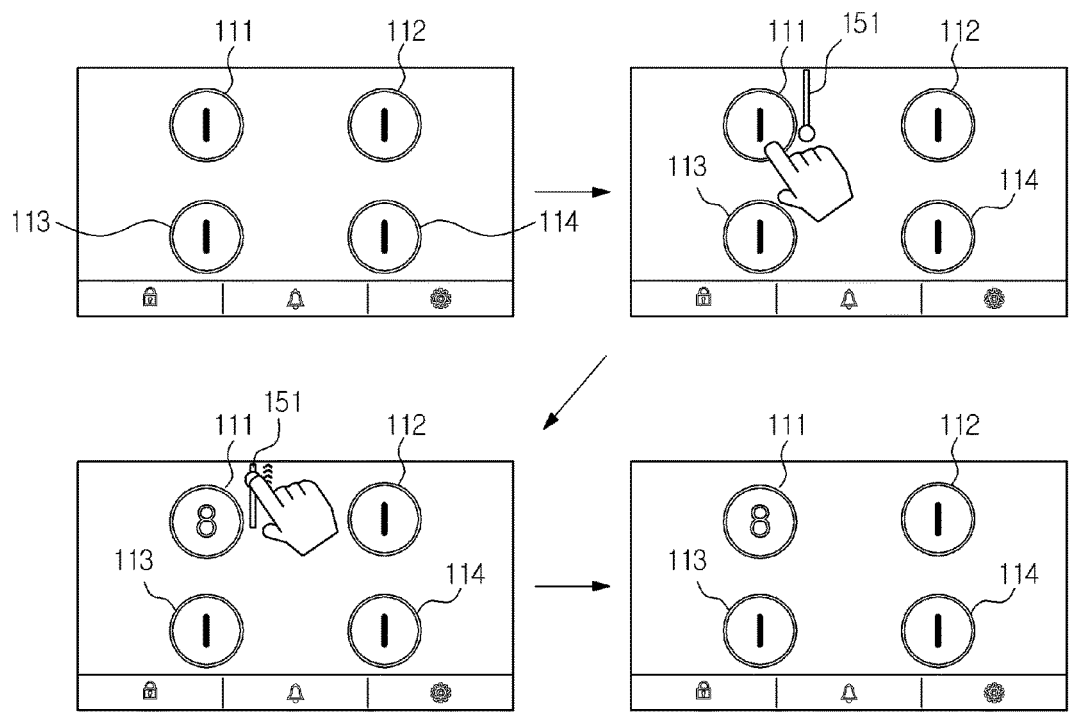
FIG. 10 illustrates a main screen on which the coils are individually controlled according to an embodiment of the present disclosure.

FIG. 10 illustrates an operation of a user interface to separately control each coil on a main screen according to an embodiment of the present disclosure.

Referring to FIG. 10, in a state that a main screen displays from the first coil state display unit 111 to the fourth coil state display unit 114, if a user presses at least one of the coil state display units 111 to 114 for longer than a predetermined period of time, a power control bar 151 is displayed at one side of the at least one coil state display unit. The power control bar 151 may have a sliding object to help the user to adjust the power level.

For example, if a user presses the first coil state display unit 11 for longer than two seconds, the power control unit 151 is displayed at the right side of the first coil state display unit 111. To more accurately adjust the power level, the power control bar 151 may be provided in a longitudinal direction. If the user performs a drag touch to the upper side on the power control bar 151, the power level indicated on the first coil state display unit 111 becomes higher. If the user performs a drag touch to the lower side on the power control bar 151, the power level indicated on the first coil state display unit 111 becomes lower. When a desired power level is indicated on the first coil state display unit 111, the user detaches the finger from the first coil state display unit 111. As a result, a power level indicated when the finger of the user is detached is set, and the control unit 30 controls the first inverter 21, such that a power corresponding to the power level newly set for the first coil 11 is supplied to the first coil 11.

The configuration of the power control bar is not limited thereto. According to another embodiment, the power control bar may be provided at an upper portion or a lower portion of the coil state display unit in a traverse direction.

Figure 11:
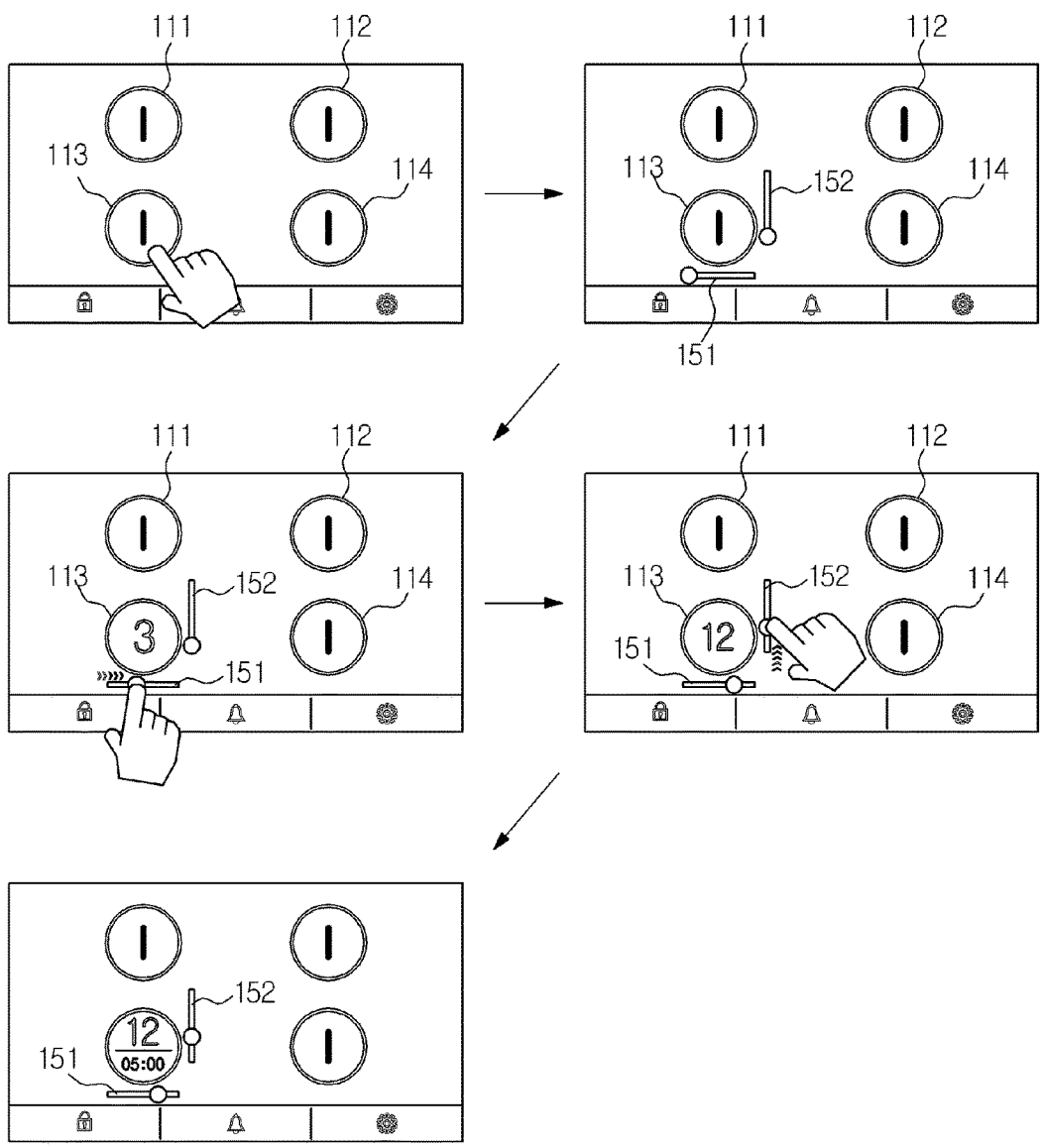
FIG. 11 illustrates a main screen on which the coils are individually controlled according to another embodiment of the present disclosure.

FIG. 11 illustrates an operation of a user interface to separately control each coil on a main screen according to another embodiment of the present disclosure.

Referring to FIG. 11, in a state that a main screen displays the coil state display units 111 to 114 for the respective coils, if a user presses one of the coil state display units 111 to 114 for longer than a predetermined duration of time, a cooking time control bar 152 is displayed at the right side of the corresponding coil state display unit in a longitudinal direction, and the power control bar 151 is displayed at the lower side of the corresponding coil state display unit in a traverse direction. The cooking time control bar 152 and the power control bar 151 may have a sliding object to help the user to adjust the cooking time and the power level.

In detail, if a user presses the third coil state display unit 113 for longer than two seconds, the cooking time control bar 152 and the power control unit 151 are displayed. If the user performs a drag touch to the right side on the power control bar 151, the power level indicated on the third coil state display unit 113 becomes higher. If the user performs a drag touch to the left side on the power control bar 151 (for example, moving the sliding object to the left), the power level indicated on the third coil state display unit 113 becomes lower. When a desired power level is indicated on the third coil state display unit 113, the user detaches the finger from the third coil state display unit 113. As a result, a power level indicated when the finger of the user is detached is set, and the control unit 30 controls the third inverter 23, such that a power corresponding to the power level newly set for the third coil 13 is supplied to the third coil 13.

If a user performs a drag touch to the upper side on the cooking time control bar 152 (for example, moving the sliding object upward), the cooking time indicated on the third coil state display unit 113 becomes higher. If the user performs a drag touch to the lower side on the cooking time control bar 152 (for example, moving the sliding object downward), the cooking time indicated on the third coil state display unit 113 becomes lower. When a desired cooking time is indicated on the third coil state display unit 113, the user detaches the finger from the third coil state display unit 113. As a result, the cooking time indicated when the finger of the user is detached is set, as a new cooking time and the control unit 30 controls the third inverter 23, such that a power is supplied to the third coil 13 during the time newly set.

The configuration or the control of the present disclosure is not limited thereto. According to another embodiment, the cooking time control bar 152 and the power control bar 151 may be switched in position, or the direction of drag touch may provide a different control on the cooking time control bar 152 and the power control bar 151. The cooking time control bar 152 and the power control bar 151 may be provided in variety of shapes.

Hereinafter, other operations performed by a user interface according to an embodiment of the present disclosure will be described.

Figure 12A:
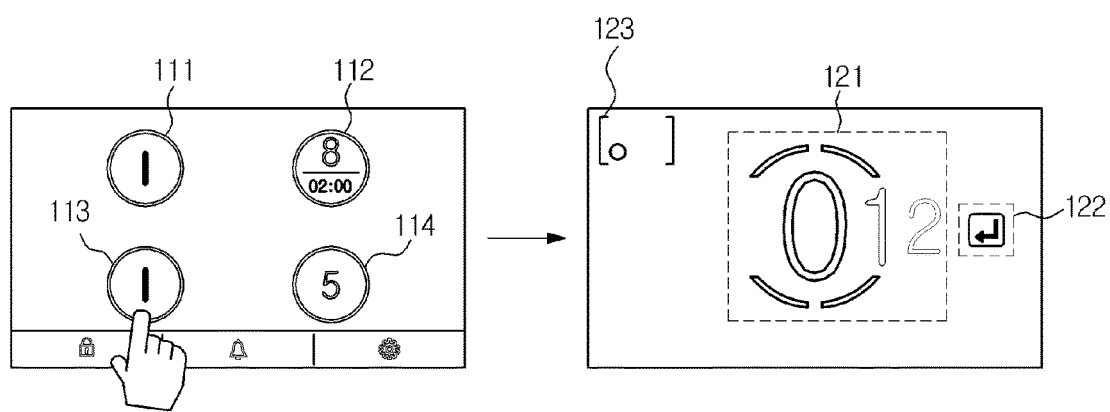
FIGS. 12A and 12B illustrate a control screen displayed by a user interface according to an embodiment of the present disclosure.
Figure 12B:
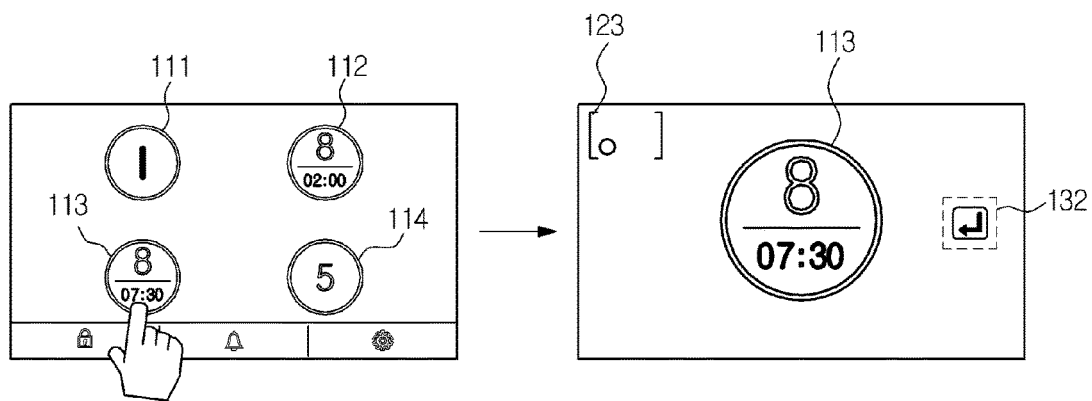

FIGS. 12A and 12B illustrate a control screen displayed by a user interface according to an embodiment of the present disclosure.

If a user touches a coil state display unit on the main screen, the user interface displays a control screen for a coil corresponding to the coil state display unit touched. In this case, the control screen may display a coil map 123 that represents the position of the coil relative to other coils. The coil map 123 is provided to indicate the relative position of each coil when viewed from above the induction heating cooker 1, so that the user may determine where the coil, that is, an object for current control exists by looking at the coil map 123.

In detail, as shown in FIG. 12A, if a user touches the third coil display unit 133 on the main screen, a control screen for the third coil 13 is displayed. In a case that the third coil 13 is in a non-operational state, which the power level and the cooking time of the third coil 13 are not set, a control screen shown in FIG. 12A is displayed to set the power level. In a case that the power level and the cooking time of the third coil 13 are set, a control screen shown in FIG. 12B is displayed.

Regardless of which control screen is displayed, the displayed screen displays the coil map 123, which indicates the position of the third coil 13 relative to other coils. The description of the coil map 123 shown FIGS. 12A and 12B is provided as an embodiment of the present disclosure. For example, the coil map 123 may be disposed at a right side or at a lower end of the control screen. For example, the control map 123 may indicate only the position of a desired coil. For example, the control map 123 may indicate the positions of all of the coils, such that an object coil for control is distinguished from other coils using a color or an icon. For example, the control map 123 may display a coil state display unit having no indication at a position corresponding to an object coil for control while displaying coil state display units showing relevant information at the positions of the respective coils.

Figure 13:
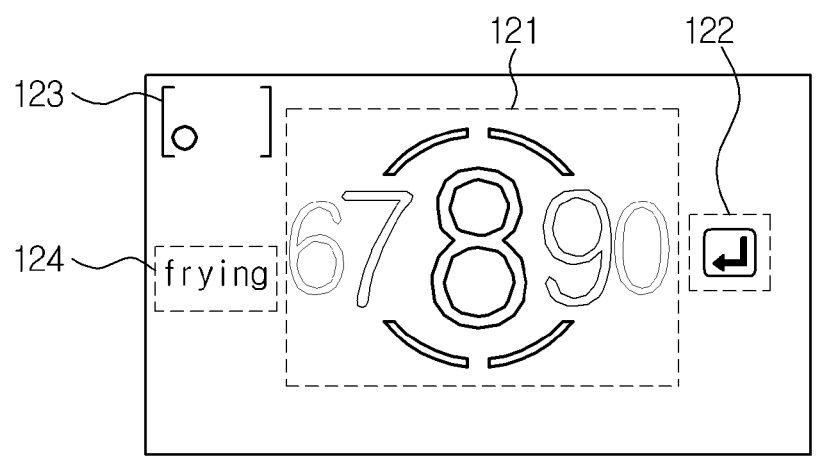
FIG. 13 illustrates a power level setting control screen displayed by a user interface according to an embodiment of the present disclosure.

FIG. 13 illustrates a power level setting control screen displayed by a user interface according to an embodiment of the present disclosure.

Referring to FIG. 13, a power level guide unit 124 is displayed at one side of the power setting unit 121. The power level guide unit 124 displays a type of cooking suitable for the power level ranging from 1 to P. For example, if the power level positioned at the center of the power setting unit 121 is indicated as "8" through a drag touch in a traverse direction, the power level guide unit 124 indicates "frying", which informs that the power level of "8" is suitable for frying. The control unit 30, which includes various types of cooking that are suited to each power level in the form of a database, displays a type of cooking corresponding to a predetermined power level at one side of the control screen used to set the power level, thereby enabling a user to select a power level suitable for a desired type of cooking.

Figure 14A:
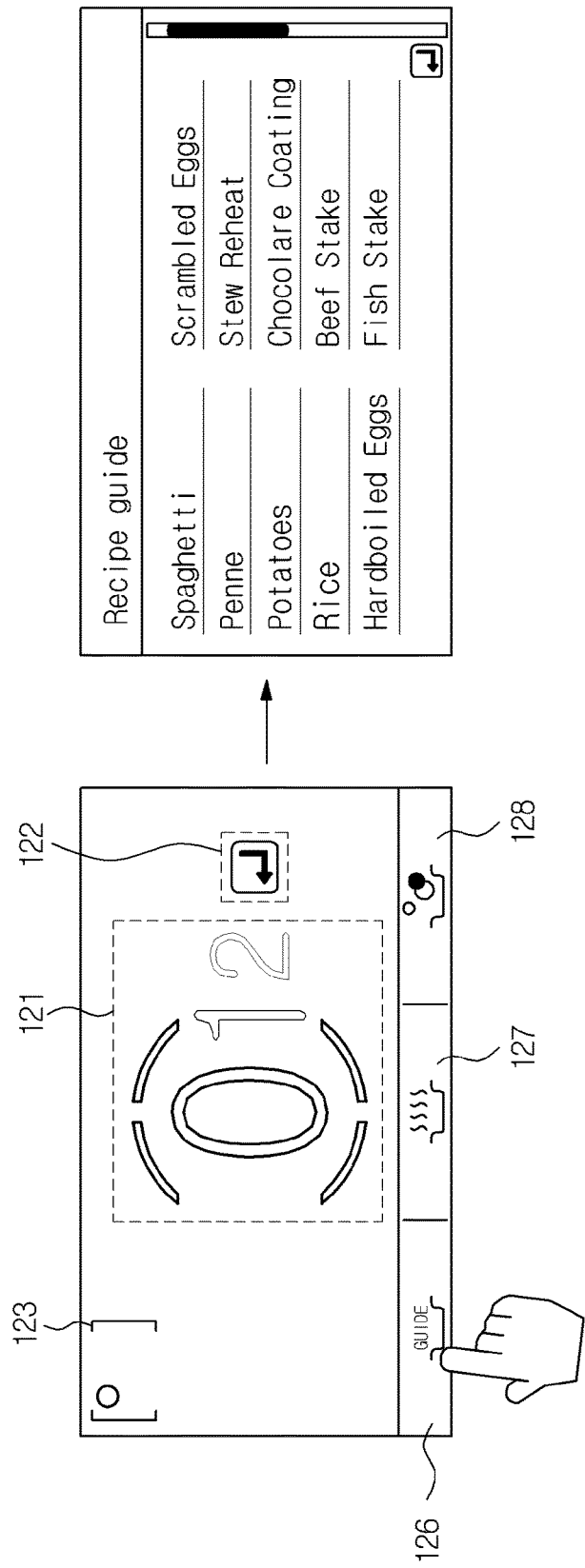
Figure 14B:
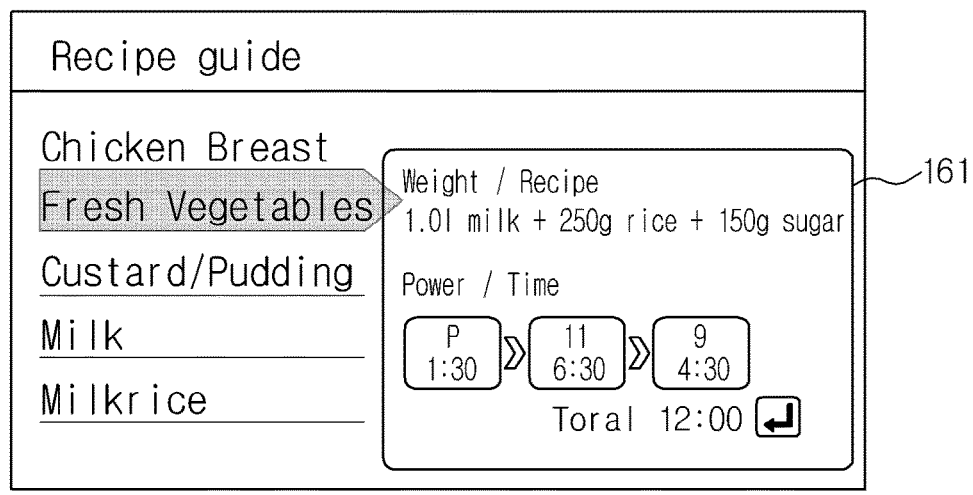

FIGS. 14A to 14C illustrate a cooking guide screen displayed by a user interface according to an embodiment of the present disclosure.

Referring to FIG. 14A, a user interface according to an embodiment of the present disclosure may display icons related to automatic cooking at a lower end of a control screen. The icons may include a cooking guide icon 126, a thermo icon 127, a water heating icon 128. The descriptions of the icons, such as the shape and the color, shown in FIG. 14A are provided only as an embodiment, and the present disclosure is not limited hereto.

If a user touches the cooking guide icon 126, the user interface displays a cooking guide screen. A default screen of the cooking guide screen indicates a list of dishes allowing an automatic cooking. If a user touches a desired dish on the list, the user interface displays a cooking guide window at one side of the selected dish, the cooking guide window showing the ingredients and a cooking process for the dish.

As shown in FIG. 14B, a cooking guide window 161 shows the ingredients of a predetermined dish, the power level and the cooking time for the power level, and the total cooking time along with a setting button. The cooking guide window 161 may display multiple stages including the power level and the cooking time for the selected dish. For example, FIG. 14B shows three stages where each stage shows different power levels and the cooking time. If a user touches the setting button, the dish is selected, and the user interface displays a cooking standby screen. FIG. 14C illustrates the cooking standby screen. Similar to a general control screen, a coil map and a coil state display unit are shown at the left upper end and at the center of the cooking standby screen, respectively. The coil state display unit displays an initial power level and a total cooking time for an automatic cooking process. Different from a general control screen, a title of a cooking guide list of dishes is indicated at a left side of the coil state display unit. A setting button 162 is indicated at a right side of the coil state display unit. If a user touches the setting button 162, an automatic cooking process starts according to the cooking guide. At this time, the user interface displays the main screen again, the coil state display unit 111 of which displays the current power level of the coil and the remaining cooking time.

If the automatic cooking is completed according to the cooking guide, a text indicating the ending of the automatic cooking is displayed on the coil state display unit, and the user interface may allow the coil state display unit to flicker or set an alarm sound.

Figure 15A:
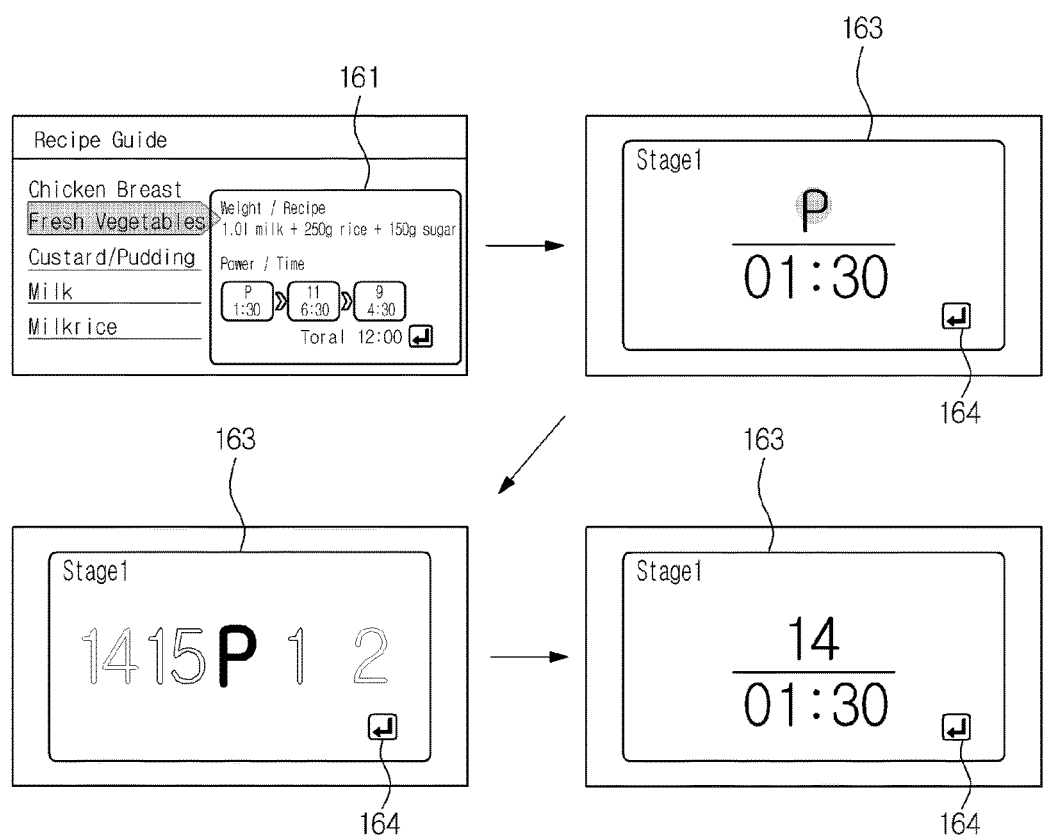
FIGS. 15A and 15B illustrate a screen on which a user modifies a part of an automatic cooking process, which is performed based on the cooking guide, according to an embodiment of the present disclosure.
Figure 15B:
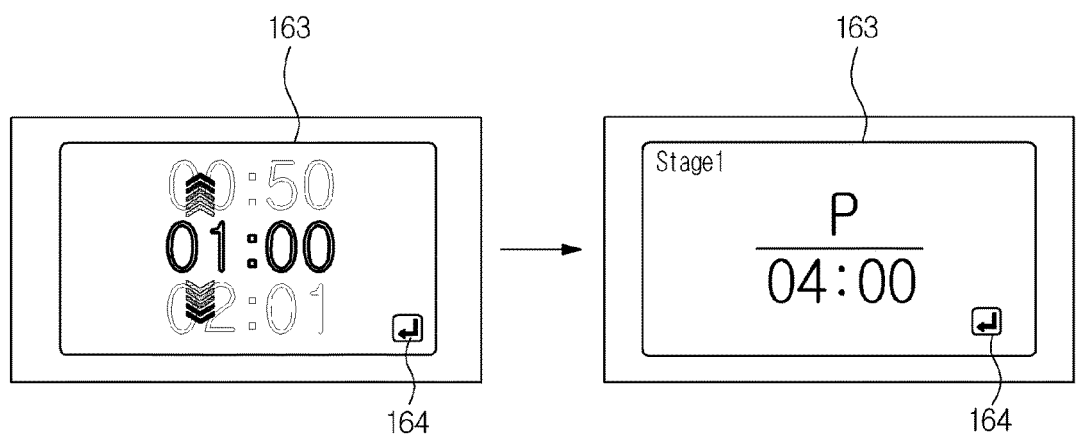

When using such a cooking guide function, the user may desire to modify the cooking process according to the tendency of a user. FIGS. 15A and 15B illustrate a screen on which a user modifies a part of an automatic cooking process, which is performed based on the cooking guide, according to an embodiment of the present disclosure.

Referring to FIG. 15A, in a state that the cooking guide window 161 is displayed, if a user desires to modify a first stage of heating for the selected dish, which is set for one and half second at the maximum power level ("P"), the user touches a region of the cooking guide window 161 where the first stage is displayed, and desired to be modified, so that a modification window 163 is displayed. A main screen of the modification window 163 may include a power level display which indicates the power level of the cooking process, a cooking time display unit which indicates the cooking time for the cooking process, and a setting button 164 to finish the setting of the power level and the cooking time.

If a user touches the power level display unit, a power setting screen is displayed on the modification window 163. At this time, the user selects a desired power level by performing a drag touch in a traverse direction of the power setting screen. If the desired power level is shown at the center of the power setting screen while on the drag touch, the user stops the drag touch and touches the setting button 164, thereby selecting the desired power level. As the setting of the power level is completed, the user interface displays the main screen of the modification window 163 again, the power level display unit of which displays the power level modified by the user.

FIG. 15B shows an operation of modifying the cooking time. If a user touches the cooking time display unit on the main screen of the modification window 163, a cooking time setting screen is displayed on the modification window 163.

At this time, the user performs a drag touch in a longitudinal direction of the cooking time setting screen and touches a desired cooking time, which is displayed while on the drag touch, thereby modifying the cooking time. The user interface displays the main screen, which shows the power level display unit and the cooking time display unit, on the modification window 163, in which the cooking time display unit shows the modified cooking time. The main screen of the modification window 163 displays the setting button 164, and the user touches the setting button 164. As a result, the cooking guide is modified according to the power level and the cooking time that are indicated on the power level display unit and the cooking time display unit, respectively.

Figure 16:
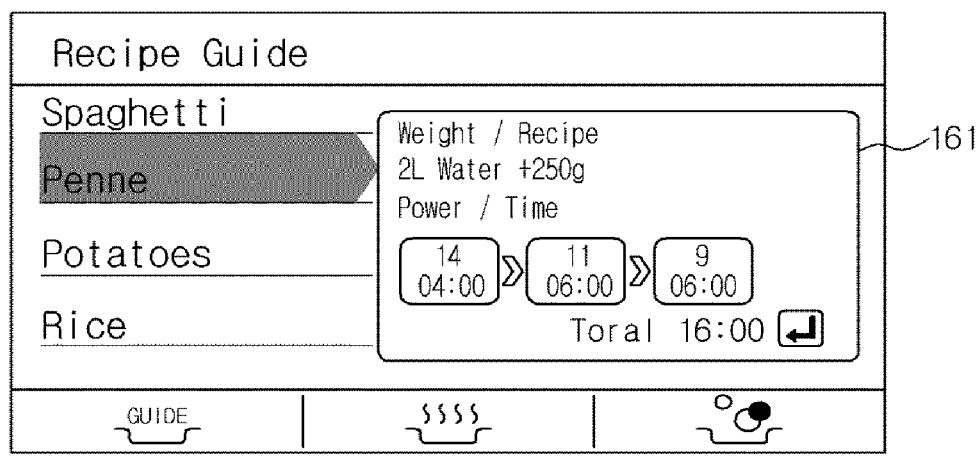
FIG. 16 illustrates a cooking guide screen showing a modified cooking guide according to an embodiment of the present disclosure.

FIG. 16 illustrates a cooking guide screen showing a modified cooking guide that according to an embodiment of the present disclosure. As the user touches the setting button 164 shown on the right side of FIG. 15B to complete the modification of the cooking guide, the user interface removes the modification window 163 and displays the screen that is provided just before the modification window 163 is displayed. That is, the user interface displays the cooking guide window 161 at one side of the list of dishes. In this case, the cooking guide window 161 shows information about each cooking process, the information having been modified by the user.

Figure 17A:
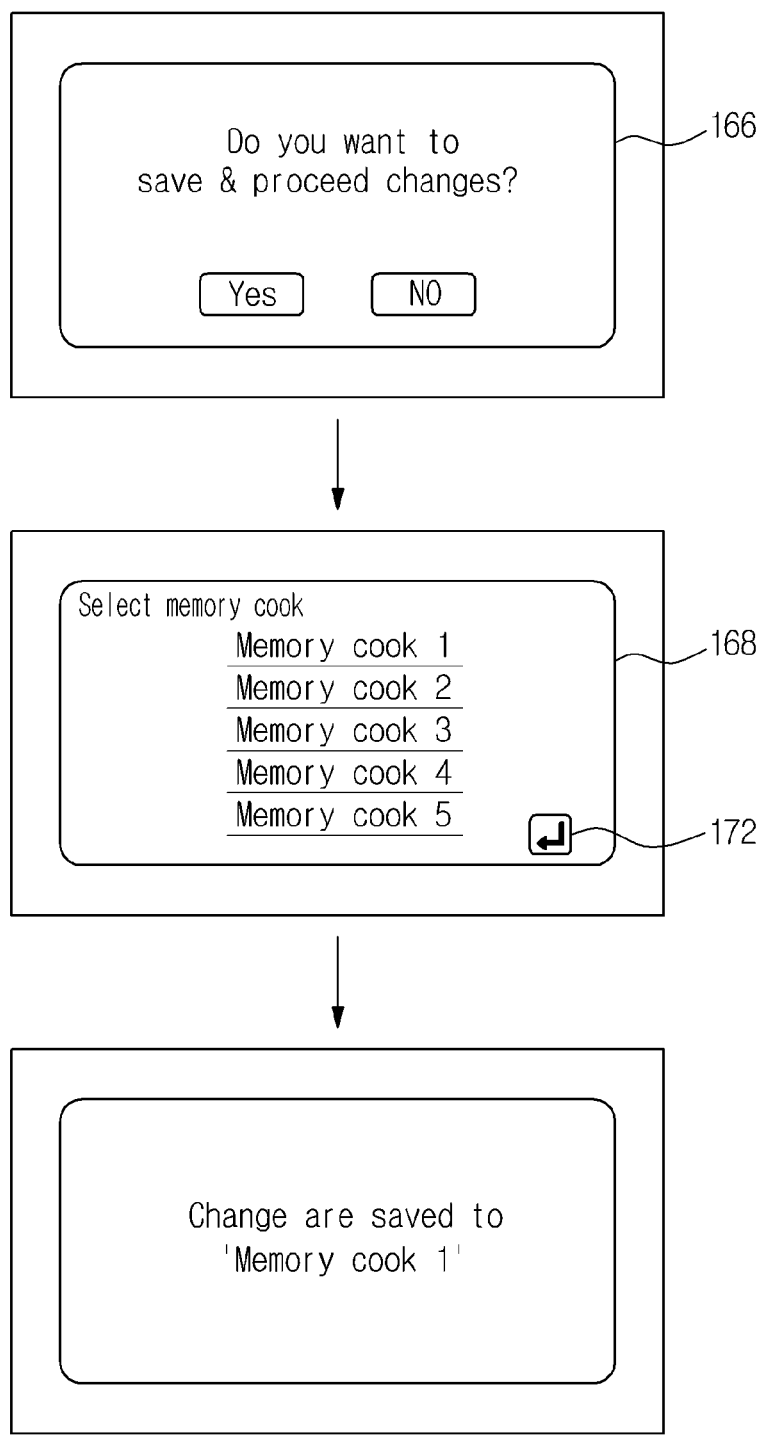
FIGS. 17A and 17B illustrate a screen at which a modified cooking guide is stored and displayed according to an embodiment of the present disclosure.

FIG. 17A shows an operation of storing the modified cooking process. If a user touches a setting button displayed on the cooking guide window 161, the user interface displays a store selection window 166 for the user whether to store the modified cooking guide and that enables the user to select. The store selection window 166 displays "YES" and "NO" buttons to choose whether to store the modified cooking guide. If the user touches "NO" button, the user interface displays the cooking standby screen.

If the user touches "YES" button, the user interface displays a memory cook selection window 168. If the user touches a desired memory cook number of the memory cook selection window 168 and touches a setting button 172, the user interface displays a window that shows a message indicating the completion of storage. After a short period of time, for example, one second or two seconds, the cooking standby screen is displayed.

Figure 17B:
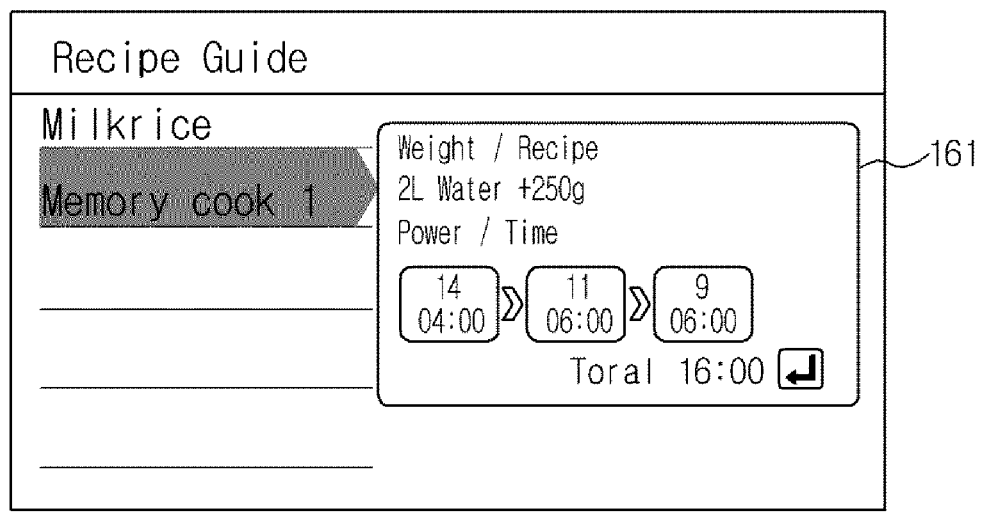

FIG. 17B shows a cooking guide screen displaying the stored cooking guide. As the user touches the cooking guide icon 126, the user interface displays the cooking guide screen in which the memory cook stored by the user is displayed on the list of dishes allowing the automatic cooking. If the memory cook is touched, the cooking guide window 161 containing the modification made by the user, is displayed at one side of the memory cook. The names of dishes may be displayed on the cooking guide window 161. In addition, a cooking process may be modified in the memory cook besides the list of dishes. In addition, the stored memory cook may be deleted.

Hereafter, functions of the thermo icon 127 and the water heating icon 128 will be described with reference to FIGS. 18A and 18B, the thermo icon 127 and the water heating icon 128 provided on a lower end of a control screen.

FIG. 18A shows an operation provided when a user touches the thermo icon 127. If a user touches the thermo icon 127 on the control screen, a cooking standby screen is displayed, such that a coil state display unit included in the cooking standby screen shows the thermo icon 127 in addition to the power level and the cooking time, and a phrase indicating a thermo state is shown at one side of the coil state display unit. If a user touches a setting button 122 displayed the other side of the coil state display unit, the control unit adjusts the power supplied to the corresponding coil, such that a vessel placed on the corresponding coil is kept in the thermo state. For example, a constant power may be supplied to maintain the power level "3."

FIG. 18B shows an operation provided when a user touches the water heating icon 128. If a user touches the water heating icon 128, a different screen is displayed depending on whether the power level of the corresponding coil has been set. In a case that the power level of the corresponding coil is set and the set power level is displayed on the coil state display unit, if the user touches the water heating icon 128 provided at the lower end of the control screen, a water heating icon is shown on the coil state display unit. At this time, if the user touches the setting icon 122 provided at one side of the screen or a predetermined time elapses without input, the water heating operation is performed. If the power level of the corresponding coil has not been set before the water heating icon 128 is touched, a window inducing the setting of the power level is displayed. At this time, if the user touches a setting button shown on the window, a power setting screen is displayed, such that a user sets the power level.

Figure 19:
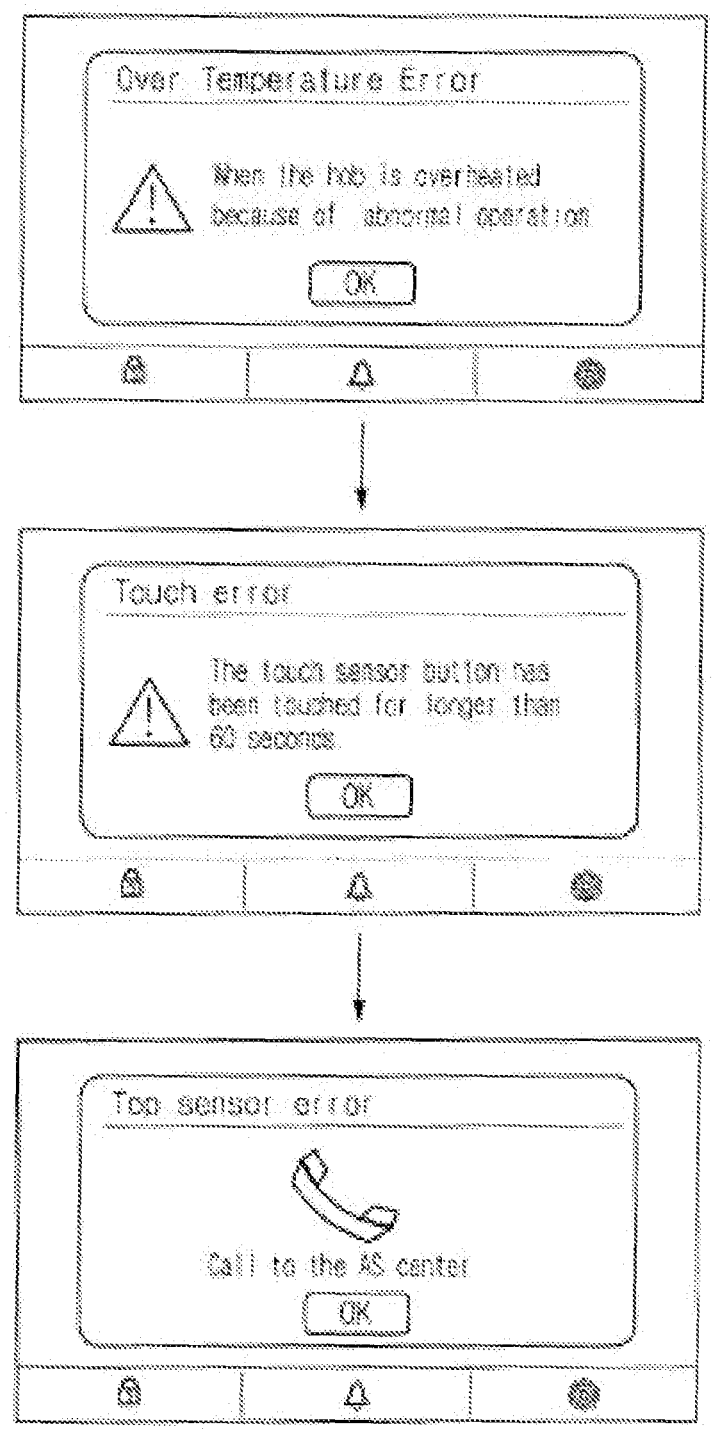
FIG. 19 illustrates an error alert window of alerting various errors on the induction heating cooker according to an embodiment of the present disclosure.

FIG. 19 illustrates an error alert window of alerting various errors on an induction heating cooker according to an embodiment of the present disclosure. Referring to FIG. 19, the user interface 100 determines that an error occurs in the induction heating cooker if the temperature of the vessel on the coil exceeds a predetermined temperate or the touch panel is subject to a touch for longer than a predetermined period of time, and displays an alert window about the error such that a user is aware of the error.

According to the above embodiments, a user selects a desired coil and controls the selected coil. As a result, the coil is heated regardless of whether a vessel is placed on the coil.

In order for the induction heating cooker 1 to automatically recognize the vessel placed on the coil, the induction heating cooker 1 further includes a vessel sensor unit. The vessel sensor unit is provided in a predetermined number corresponding to the number of the coils. The vessel sensor unit detects a heating coil, on which a vessel is placed, by use of various types of sensors including a current transformer sensor, a current sensor, a voltage sensor, a pressure sensor, and an infrared sensor. When the vessel sensor unit is implemented using a current transformer sensor, a heating coil, on which a vessel is placed, is detected based on the value of current flowing through each heating coil measured through the current transformer sensor. According to this embodiment, a technique of sensing a heating coil is achieved by use of a sensor, but the present disclosure is not limited thereto.

Figure 20:
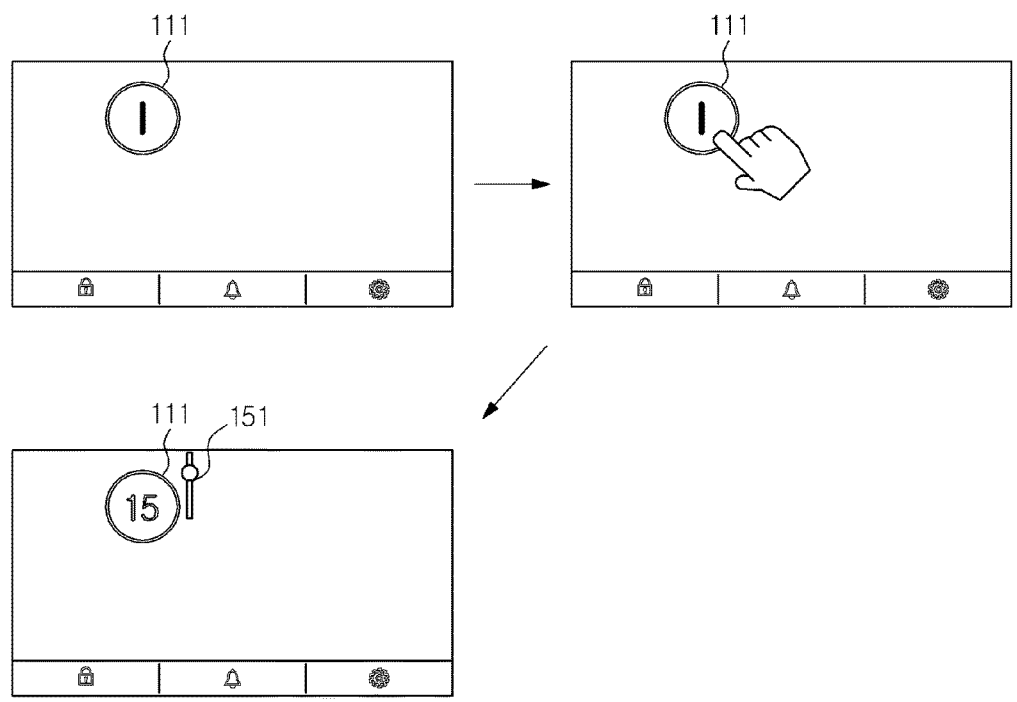
FIG. 20 illustrates a main screen provided when the induction heating cooker recognizes a cooking vessel by itself according to an embodiment of the present disclosure.

FIG. 20 illustrates a main screen provided when the induction heating cooker automatically recognizes a cooking vessel according to an embodiment of the present disclosure.

Referring to FIG. 20, a main screen of the user interface of the induction heating cooker capable of recognizing a vessel is configured to indicate only a coil state display unit for a coil having a vessel placed thereon. According to an embodiment, a vessel is placed on the first coil 11 and the current sensor detects the vessel. As a result, the first coil state display unit 111 is displayed at an area of the main screen, the area corresponding to the position of the first coil 11. Since the remaining coil state display units corresponding to the coils on which a vessel is not placed are not displayed, a user identifies which coil is in operation.

When considered the operation of controlling the power level on the main screen, a user presses the first coil display unit 111 for longer than a predetermined period of time, the power control bar 151 is displayed at one side of the first coil state display unit 111. At this time, the user performs a drag touch in a longitudinal direction on the power control bar 151, thereby setting a desired power level. Except for the remaining coil state display units that are not displayed on the main screen, the operation of the user interface according to this embodiment is same as the operation in the case when the induction heating cooker does not have the ability to recognize a vessel by itself. Even if a coil is recognized as having a vessel placed thereon, if the power level of the coil does not exceed 0, the coil is considered in a non-operational state. Accordingly, when the above embodiment of controlling all of the coils in operation by performing a drag touch across the entire surface of the screen is implemented, the coil recognized as having a vessel but considered in a non-operational state is not changed by the drag touch.

In addition, similar to the above described embodiments, a coil state display unit for a coil, on which a vessel is not placed, may be displayed on the main screen in the induction heating cooker capable of recognizing a vessel automatically.

Figure 21A:
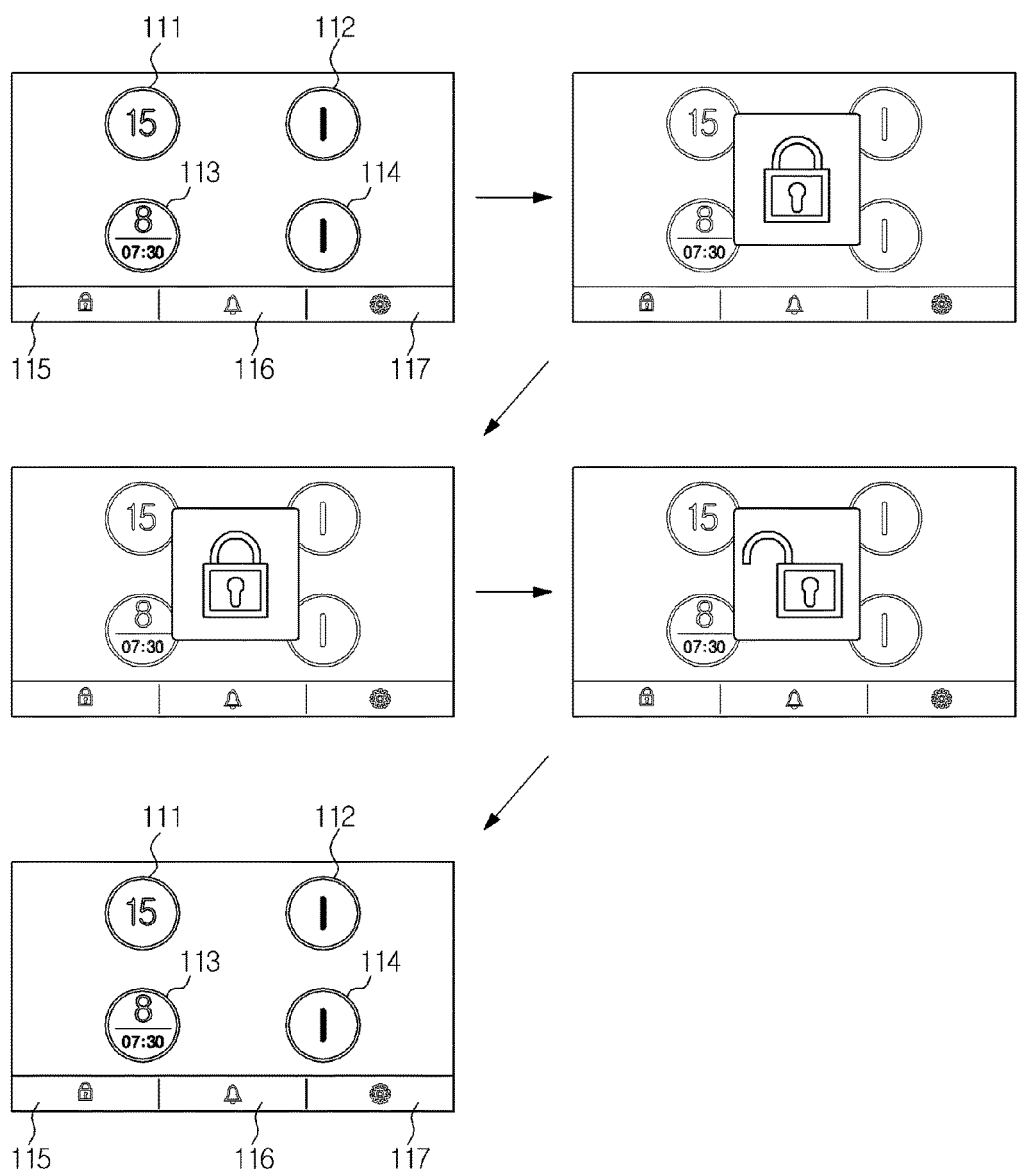
FIGS. 21A to 21C illustrate a screen which performs option functions of an induction heating cooker, including a lock function, an alarm function, and an setting function, according to an embodiment of the present disclosure.
Figure 21B:
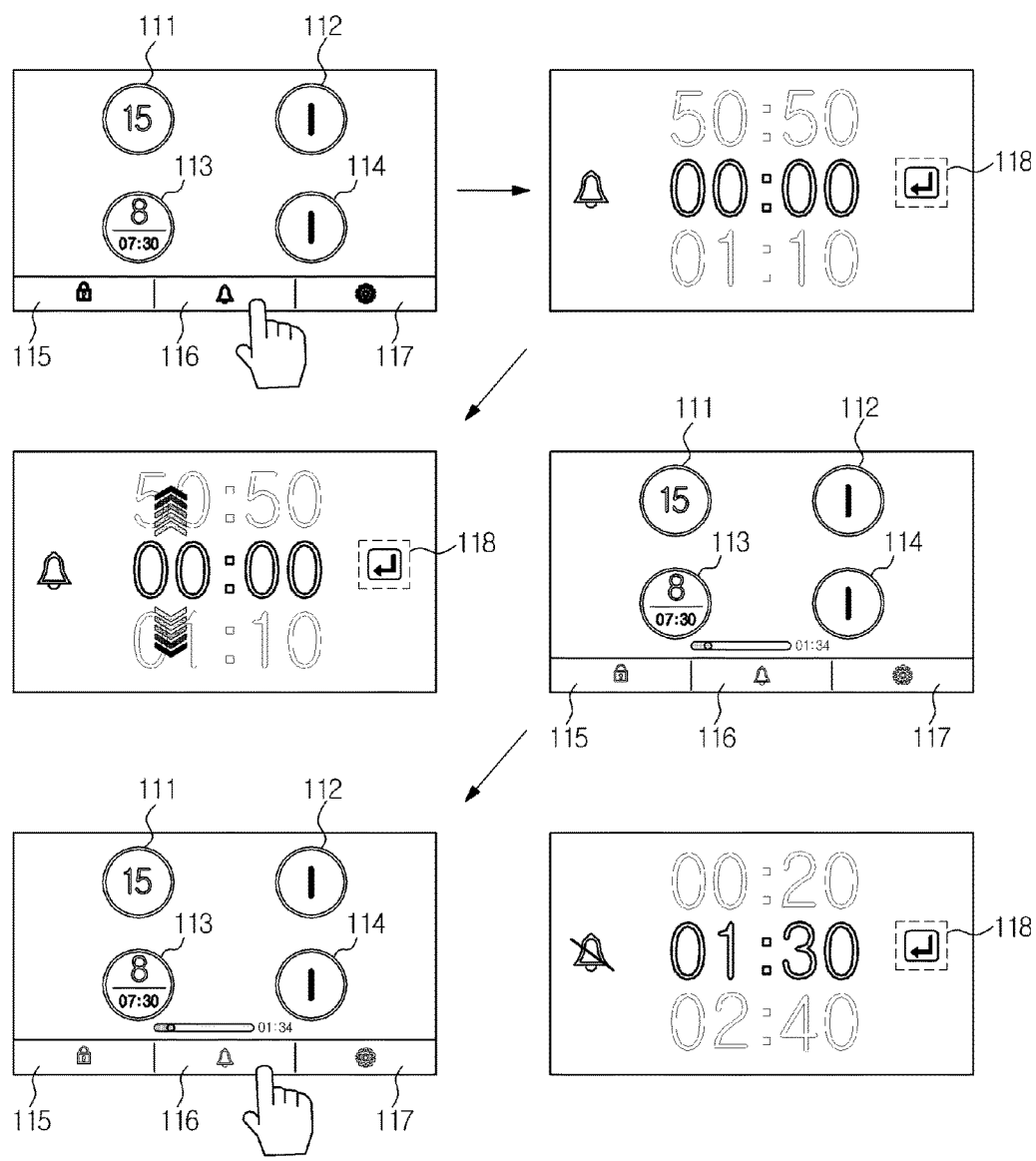
Figure 21C:
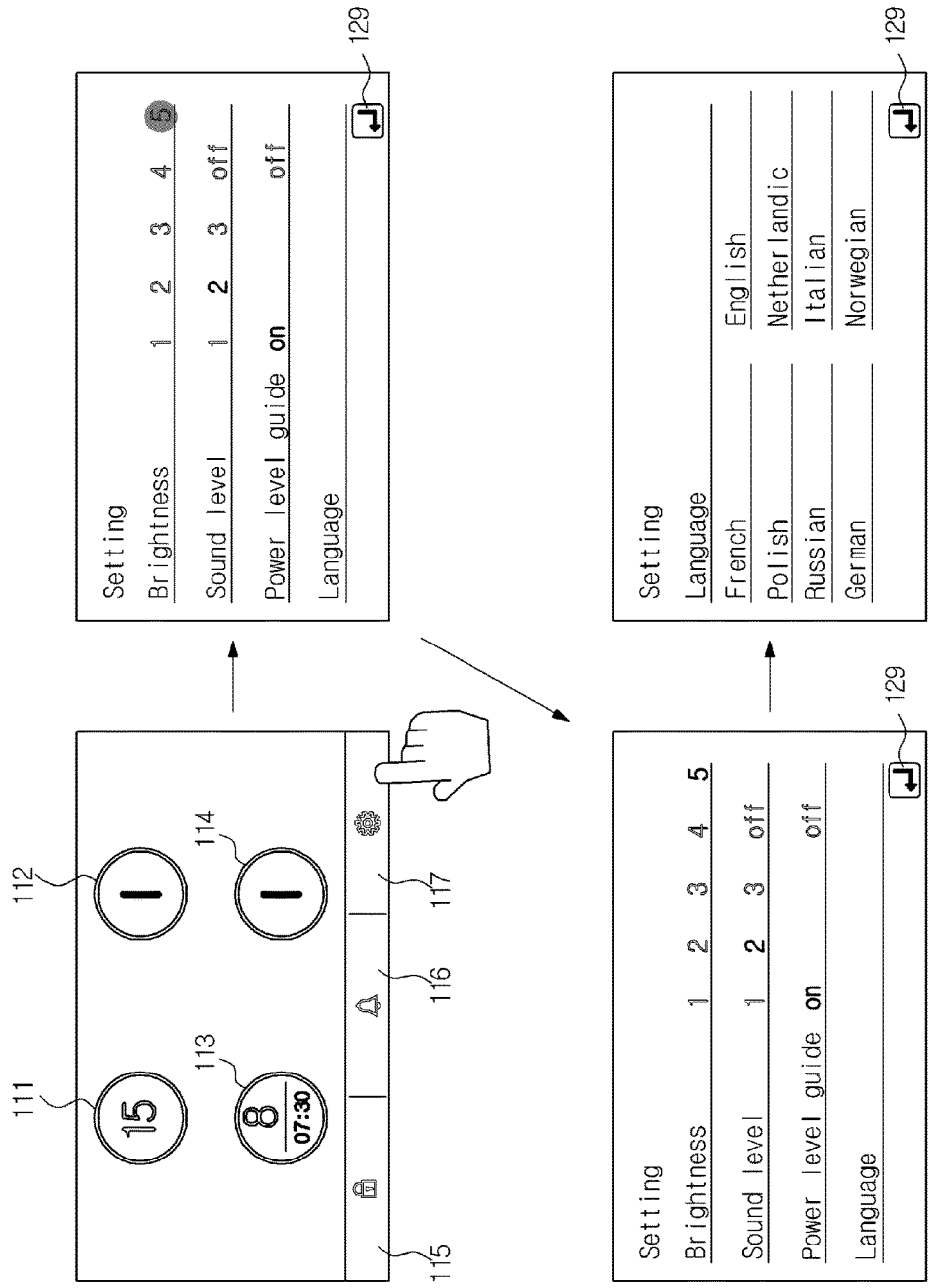

FIGS. 21A to 21C illustrate a screen which performs optional functions of an induction heating cooker, including a lock function, an alarm function, and an setting function, according to an embodiment of the present disclosure.

Referring to FIG. 21A, a lock function icon 115 for a lock function, an alarm function icon 116 for an alarm function, and a setting function icon 117 are displayed at a lower end of the main screen. If a user touches the lock function icon 115, the user interface displays a lock window at the center of the main screen. If an icon in the form of a lock is displayed on the lock window, a user is easily recognized that the induction heating cooker is currently locked.

If the user presses the icon displayed on the lock window for longer than a predetermined period of time, the icon on the lock window is changed in the form of a lock opened indicating that the induction heating cooker is unlocked. After the predetermined period of time, the lock window disappears and the main screen appears again.

Referring to FIG. 21B, if a user touches the alarm function icon 116 on the main screen, an alarm setting screen is displayed. The alarm may be set similar to the method of setting the cooking time. After the setting of an alarm is completed, the main screen is displayed again in which a gauge bar is displayed at a lower end of the main screen to indicate the time remaining until the alarm is due. In order to cancel or change the alarm function in execution of the alarm function, the alarm function icon 116 is touched again, such that the alarm setting screen is displayed. A button to cancel the alarm function is provided at one side of the alarm setting screen. If the user touches the button, the alarm function is canceled and the main screen resumes.

Referring to FIG. 21C, if a user touches the setting function icon 117 on the main screen, a default setting screen is displayed. A list of items that may be set or changed by a user is provided on the default setting screen. For example, the default setting screen may display items such as brightness, sound level, power level guide, and language. Options for each item, that is, brightness from 1 to 5, sound levels from 1 to 3 and sound off, and power level guide function ON/OFF may be provided at one side of the name of each item. Accordingly, a user touches the options by one to change the setting of the items. Also, options for language may be displayed at one side of the item of language.

However, if the item of language has a great variety of selections, a shift to a language setting screen is made as shown in FIG. 21C.

Although not shown in drawings, the induction heating cooker according to an embodiment is capable of controlling a plurality of coils in an integrated manner as a single coil. In detail, coil state display units corresponding to some coils, which are desired by a user for integrated control, are drag-touched by user in a longitudinal direction or a traverse direction, so that the coils are regarded as a single coil for control.

Hereinafter, a method of controlling a user interface according to an embodiment of the present disclosure will be described with reference to the accompanying flowcharts.

Figure 22:
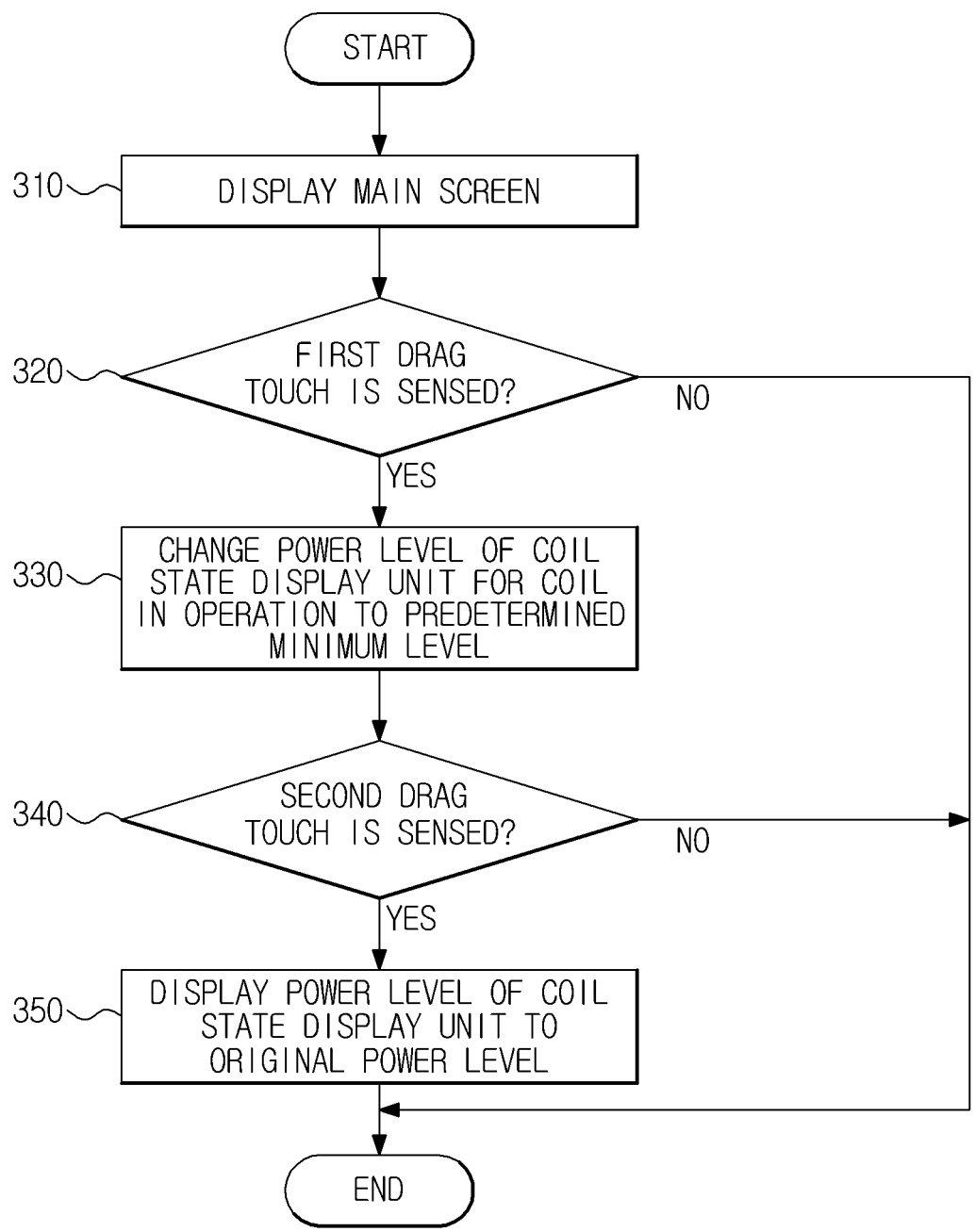
FIG. 22 is a flowchart showing a control method of a user interface for simultaneously controlling the power levels of coils in operation according to an embodiment of the present disclosure.

FIG. 22 is a flowchart showing a control method of a user interface for simultaneously controlling the power levels of coils in operation according to an embodiment of the present disclosure. Referring to FIG. 22, a main screen for a touch panel is displayed (310). The main screen includes coil state display units each representing a respective state of a plurality of coils forming the induction heating cooker. The main screen is displayed on the touch panel if no input has been input to a user interface during a cooking process.

It is determined whether a first drag touch is sensed on the touch panel (320). The drag touch represents an operation in which a user touches one position of the touch panel and drags to another position while maintaining the touch. That is, the drag touch represents a drag movement of a finger, while maintaining a touch state, from one position to another position of the touch panel. A designer may designate the distance between one position and the other position at the first drag touch. The distance may be the traverse length of the touch panel, or half the traverse length of the touch panel. In addition, the first drag touch represents a drag touch that is sensed at first in a state that the main screen is displayed on the touch panel.

If it is determined, in operation 320, that the first drag touch is sensed, a coil state display unit for a coil in operation among the coil state display units included in the main screen displays a predetermined standard level as power level (330). According to this embodiment, the standard level may be set to the minimum level. A control unit controls an inverter, such that the coil in operation is supplied with a power corresponding to the standard level. The predetermined standard level may previously be designated by a designer or a user at a level ensuring a safety in the absence of a user.

Thereafter, it is determined whether a second drag touch is sensed (340). The second drag touch represents a drag touch sensed after the first drag touch is sensed. The second drag touch may be performed in the same direction as or a different direction from the first drag touch.

If it is determined, in operation 340, that the second drag touch is sensed, the coil state display unit, the power level of which is changed to the standard level, returns the original power level. That is, the coil state display unit displays the power level provided when the first drag touch is sensed (350).

As described above, the first drag touch and the second drag touch are distinguished from each other based on the sequence of touch sensed. Alternatively, the first drag touch may be identified as a drag touch having a direction from the right side to the left side. Alternatively, the first drag touch may represent the sooner sensed drag touch, and the second drag touch may be identified as a drag touch having a different direction from that of the first drag touch. However, the method of distinguishing the first drag touch from the second drag touch is not limited thereto. For example, a user may use two fingers to perform the drag touch to achieve same result as shown above.

Figure 23:
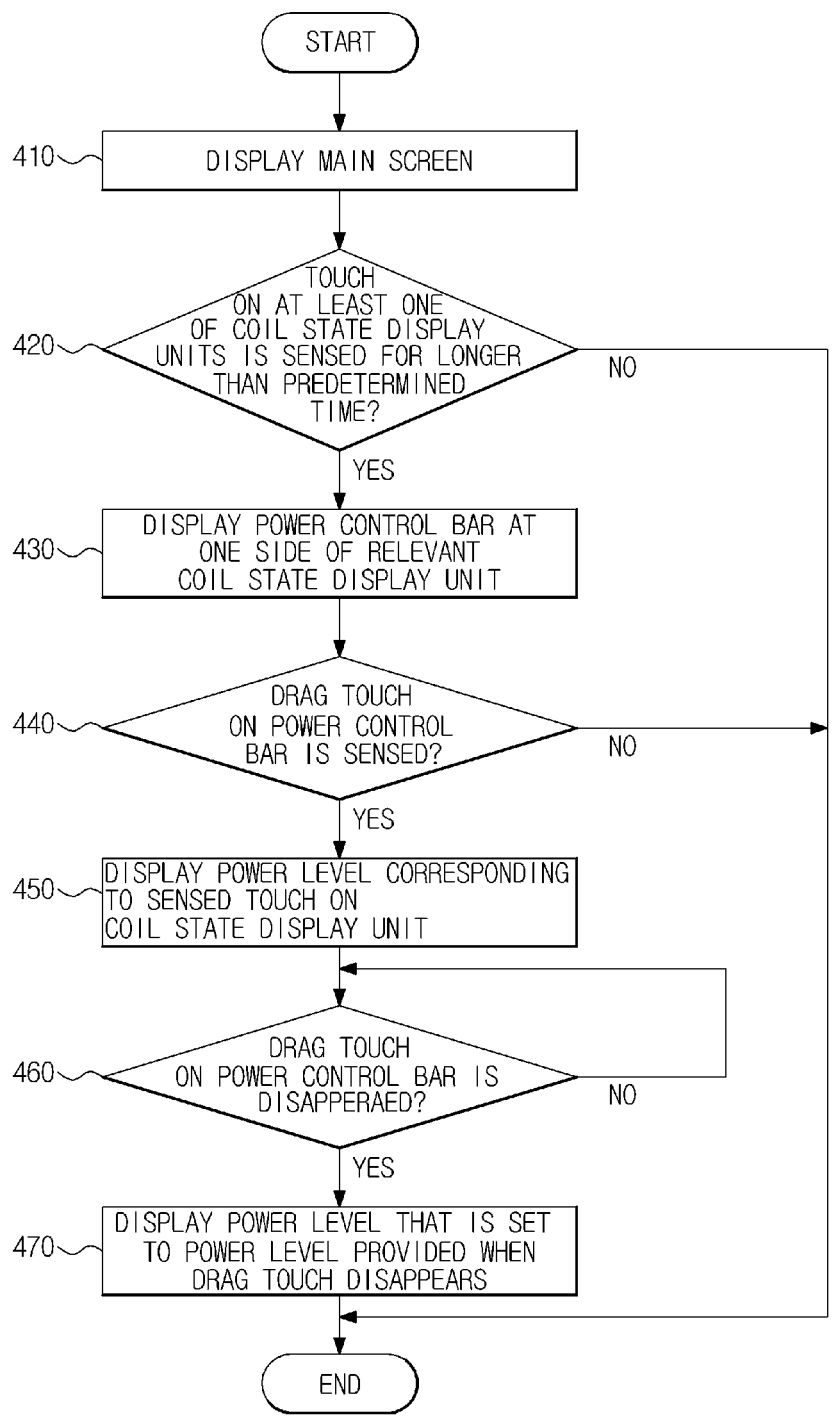
FIG. 23 is a flowchart showing a control method of a user interface for individually controlling the power levels of coils on a main screen according to an embodiment of the present disclosure.

FIG. 23 is a flowchart showing a control method of a user interface for individually controlling the power levels of coils on a main screen according to an embodiment of the present disclosure.

First, a main screen is displayed on a touch panel (410). Details of the main screen are the same as that described with reference to FIG. 21. Thereafter, it is determined whether a touch having longer than a predetermined time is sensed on at least one of the coil state display units included in the main screen. The touch represents a state of being pushed for longer than the predetermined time.

If the touch is sensed for longer than the predetermined time in operation 420, a power control bar is displayed at one side of the coil state display unit (430). A user may control the power level of the coil by performing a drag touch in a longitudinal direction or a traverse direction. If the power control bar is displayed in a longitudinal direction, a user performs a drag touch either upward or downward direction. If the power control bar is displayed in a traverse direction, a user performs a left and right drag touch.

If a drag touch on the power control bar by a user is sensed, a power level corresponding to the sensed drag touch is displayed on the coil state display unit (450). In this manner, the user selects a desired power level by drag-touching the power control bar.

If the drag touch sensed disappears (460), that is, the user detaches the finger from the touch panel, the power level provided at the moment when the finger is detached is set as the power level for the coil and the power level is displayed (470). The control unit supplies the coil with a power corresponding to the power level.

Figure 24:
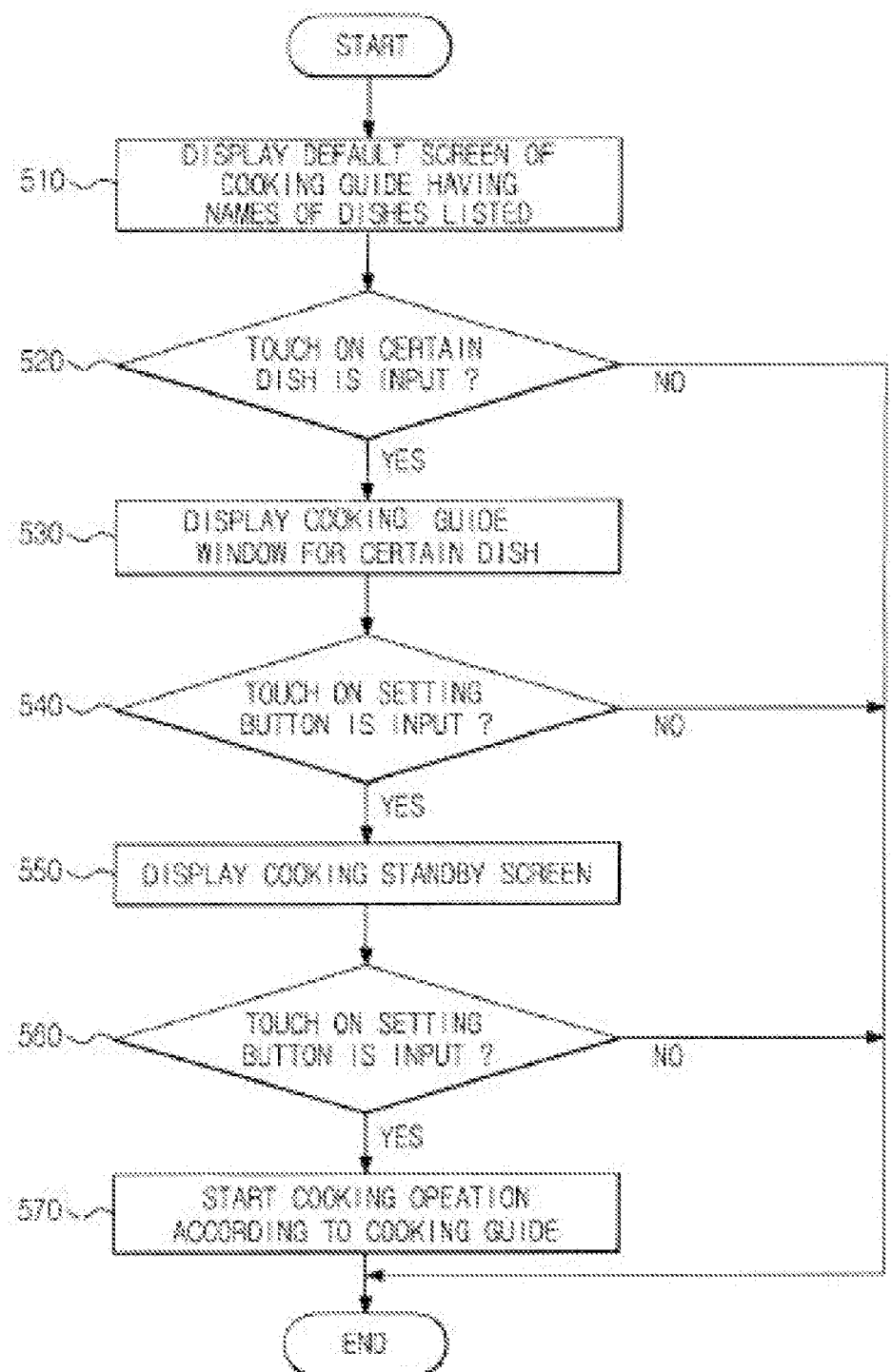
FIG. 24 is a flowchart showing a control method of a user interface for providing a cooking guide according to an embodiment of the present disclosure.

FIG. 24 is a flowchart showing a control method of a user interface for providing a cooking guide according to an embodiment of the present disclosure.

When it is assumed that a user has touched a cooking guide icon on a control screen on a certain coil, a default screen having a list of dishes allowing a cooking guide is displayed (510). The name of each dish allowing the cooking guide may be designated by a user in advance or may be further set or changed by a user.

If a touch signal by a user on a certain dish of the item is sensed (520), a cooking guide window on the certain dish is displayed (530). The cooking guide window displays ingredients or a cooking process for the certain dish. A user looks the contents displayed on the cooking guide window and touches a setting button displayed at one region of the cooking guide window, thereby selecting a desired dish.

If a touch signal for the setting button is input by the user (540), a cooking standby screen is displayed (550). The cooking standby screen displays the initial power level, the total cooking time and the desired menu. In addition, a setting button is displayed at one region of the cooking standby screen. If a touch signal for the setting button by the user is input (560), the main screen is displayed and a cooking operation is started according to the cooking guide (570).

The cooking process of the cooking guide may be modified as described above with reference to FIGS. 15 and 16. The cooking operation may be performed according to the modified cooking process, and the modified cooking process may be stored in the memory cook.

The accompanying drawings and the detailed descriptions have been provided as embodiments of the present disclosure, and the present disclosure is not limited to the drawings and descriptions. In particular, the user interface shown in the drawings has been provided as embodiments that can be applied to the present disclosure, and thus is not limited to the configuration and the external appearance shown in the drawings as long as performing the above described operation.

As described above, the user interface according to the present disclosure and the control method of thereof can adjust the power levels of all of the coils in operation without shifting over screen from the main screen, thereby enabling a rapid control and improving the safety.

In addition, since the power control bar or the cooking time control bar for each coil is displayed on the main screen, even if the touch panel is small, the power or the cooking time is controlled without shifting to the control screen, thereby reducing cost and enhancing time efficiency.

In addition, when a cooking guide function is provided, a cooking process is modified based on the tendency of a user, and the modified cooking process is stored. In addition, when the power for each coil is set, the type of cooking suitable for each power level is provided so that the user can select a power level suited to a desired cooking. In addition, when a control screen for a predetermined coil is displayed, a coil map is displayed at one side of the control screen so that a user can precisely recognize the position of a coil to be controlled, thereby improving the convenience of the user.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface for an induction heating cooker having a plurality of heating coils, the user interface comprising:
   a display configured to display a plurality of coil state displays that show operation states of the plurality of heating coils, respectively; and
   a sensor configured to sense a touch signal that is input through the display,
   wherein when the sensor continuously senses the touch signal corresponding to one of the plurality of coil state displays corresponding to one of the plurality of heating coils for a predetermined time or more, the display displays a power control bar extending in a first direction corresponding to the one of the plurality of coil state displays and a time control bar extending in a second direction, which is substantially perpendicular to the first direction, corresponding to the one of the plurality of coil state displays, the power control bar is configured to adjust a power level of the one of the plurality of heating coils corresponding to the one of the plurality of coil state displays and the time control bar is configured to adjust a cooking time of the one of the plurality of heating coils.

2. The user interface of claim 1, wherein when the sensor senses a drag touch in the first direction on the power control bar, the display displays a power level for the one of the plurality of coil state displays while increasing the power level in steps, and when the sensor senses a drag touch in an opposite direction of the first direction on the power control bar, the display displays a power level for the one of the plurality of coil state displays while decreasing the power level in steps.

3. The user interface of claim 2, wherein when the sensor senses that the drag touch with respect to the power control bar disappears, the display keeps displaying a power level that is provided at a time when the drag touch disappears.

4. An induction heating cooker having a plurality of heating coils, comprising:
   a user interface of the induction heating cooker, upon a continuous sensing of a touch signal for one of a plurality of coil state displays corresponding to one of the plurality of heating coils displayed on a display for a predetermined time or more, configured to allow the display to display a power control bar extending in a first direction corresponding to the one of the coil state displays and a time control bar extending in a second direction, which is substantially perpendicular to the first direction, corresponding to the one of the coil state displays, the power control bar configured to adjust a power level of one of the plurality of heating coils corresponding to the one of the plurality of coil state displays and the time control bar configured to adjust an operating time of the one of the plurality of heating coils; and
   a controller, when the user interface senses a touch signal for the power control bar, configured to supply the one of the plurality of heating coils with a power corresponding to a power level that is represented by the touch signal sensed by the user interface.

5. The user interface of claim 4, wherein when the sensor senses a drag touch in the first direction on the power control bar, the display displays a power level on the one of the plurality of coil state displays while increasing the power level in steps, and when the sensor senses a drag touch in an opposite direction of the first direction on the power control bar, the display displays a power level on the one of the plurality of coil state displays while decreasing the power level in steps, and
   wherein when the sensor senses a drag touch in the second direction on the time control bar, the display unit displays the cooking time on the one of the plurality of coil state displays while increasing the cooking time, and when the sensor senses a drag touch in an opposite direction of the second direction on the time control bar, the display displays the cooking time on the one of the plurality of coil state displays while decreasing the cooking time.

6. The user interface of claim 5, wherein when the sensor senses that a drag touch on the power control bar disappears, the display keeps displaying a power level that is provided at a time when the drag touch disappears, and
   wherein when the sensor senses that a drag touch on the time control bar disappears, the display keeps displaying the cooking time that is provided at a time when the drag touch disappears.

7. A user interface for an induction heating cooker having a plurality of heating coils, the user interface comprising:
   a display configured to display a plurality of coil state displays that show operation states of the plurality of heating coils, respectively; and
   a sensor configured to sense a touch signal that is input through the display,
   wherein when the sensor continuously senses the touch signal corresponding to one of the plurality of coil state displays corresponding to one of the plurality of heating coils for a predetermined time or more, a first control bar extending in a first direction corresponding to the one of the plurality of coil state displays and a second control bar extending in a second direction which is substantially perpendicular to the first direction, corresponding to the one of the plurality of coil state displays come into view.

8. A user interface for an induction heating cooker having a plurality of heating coils, the user interface comprising:
a display configured to display a plurality of coil state displays that show operation states of the plurality of heating coils, respectively; and
a sensor configured to sense a touch signal that is input through the display,
wherein when the sensor continuously senses the touch signal corresponding to one of the plurality of coil state displays corresponding to one of the plurality of heating coils for a predetermined time or more, a power control bar corresponding to the one of the plurality of coil state displays comes into view, the power control bar is configured to adjust a power level of the one of the plurality of heating coils corresponding to the one of the plurality of coil state displays,
wherein in response to the sensor sensing a drag touch in the one direction on the power control bar, the display displays a power level for the one of the plurality of coil state displays while increasing the power level in steps, and in response to the sensor sensing a drag touch in an opposite direction on the power control bar, the display displays a power level for the one of the plurality of coil state displays while decreasing the power level in steps.

9. The user interface of claim 8, wherein in response to the sensor sensing that a drag touch with respect to the power control bar disappears, the display keeps displaying a power level that is provided at a time when the drag touch disappears.

* * * * *